United States Patent
Hosaki

(10) Patent No.: US 8,244,033 B2
(45) Date of Patent: Aug. 14, 2012

(54) IMAGE ENCODING APPARATUS, IMAGE DECODING APPARATUS, AND CONTROL METHOD THEREOF

(75) Inventor: Kenta Hosaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 12/464,535

(22) Filed: May 12, 2009

(65) Prior Publication Data

US 2009/0285479 A1 Nov. 19, 2009

(30) Foreign Application Priority Data

May 13, 2008 (JP) .................... 2008-126454
Nov. 21, 2008 (JP) .................... 2008-298570
Jan. 22, 2009 (JP) .................... 2009-012342

(51) Int. Cl.
*G06K 9/36* (2006.01)
(52) U.S. Cl. .................................................. 382/166
(58) Field of Classification Search .......... 382/232–252, 382/166; 358/1.9, 426.01, 426.16; 375/240.01–240.26
See application file for complete search history.

(56) References Cited

U.S. PATENT DOCUMENTS

| | | | | |
|---|---|---|---|---|
| 5,241,395 A | * | 8/1993 | Chen | 358/426.14 |
| 5,414,527 A | | 5/1995 | Koshi et al. | 358/433 |
| 6,067,320 A | * | 5/2000 | Takahashi et al. | 375/240.12 |
| 6,072,909 A | * | 6/2000 | Yokose et al. | 382/247 |
| 2005/0180645 A1 | * | 8/2005 | Hasegawa et al. | 382/239 |
| 2008/0095455 A1 | | 4/2008 | Hosaki | 382/248 |
| 2008/0317362 A1 | | 12/2008 | Hosaki et al. | 382/233 |
| 2009/0080531 A1 | | 3/2009 | Hashiguchi et al. | 375/240.24 |

FOREIGN PATENT DOCUMENTS

JP 5-056282 A 3/1993

* cited by examiner

*Primary Examiner* — Samir Ahmed
(74) *Attorney, Agent, or Firm* — Fitzpatrick, Cella, Harper & Scinto

(57) ABSTRACT

This invention generates, from multi-value image data, encoded data having a fixed length of L bits for each block including m×n pixels. An extraction unit extracts representative two colors C0 and C1 from an input block. A detection unit generates binary identification information, which indicates one of the colors C0 and C1 to which each pixel in the block is approximate. A generating unit determines, according to a deletion pattern, which of identification data elements indicating the color C0 and those indicating the color C1 are deleted more, and outputs the determination result as inter-polated-identification data. A replacing unit replaces identification data which is the same as non-interpolated-identification data near the pixel position by the interpolated-identification data. A deletion unit deletes identification data according to the deletion pattern. A packing unit couples and outputs the colors C0 and C1, interpolated-identification data, and identification data after deletion.

25 Claims, 19 Drawing Sheets

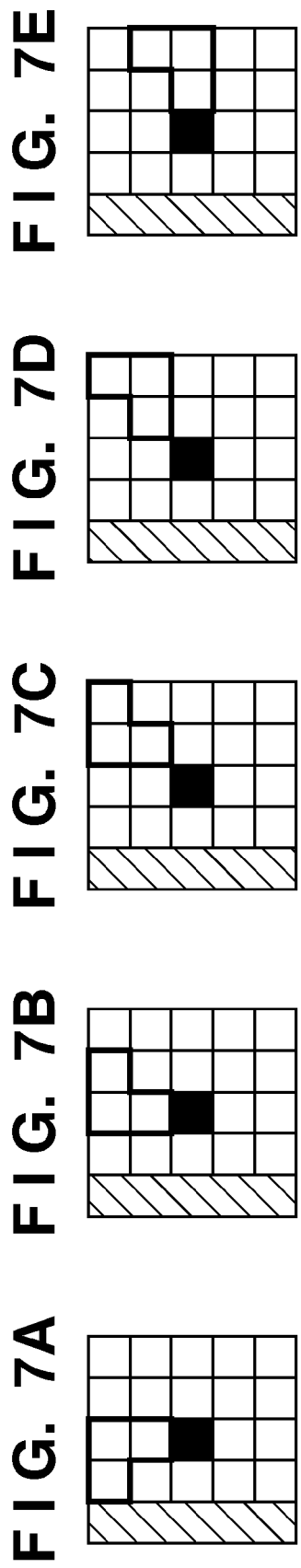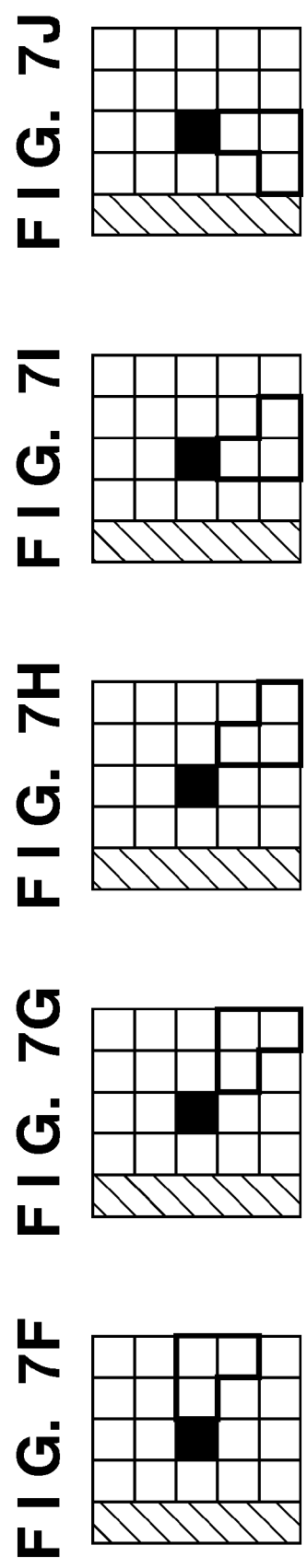

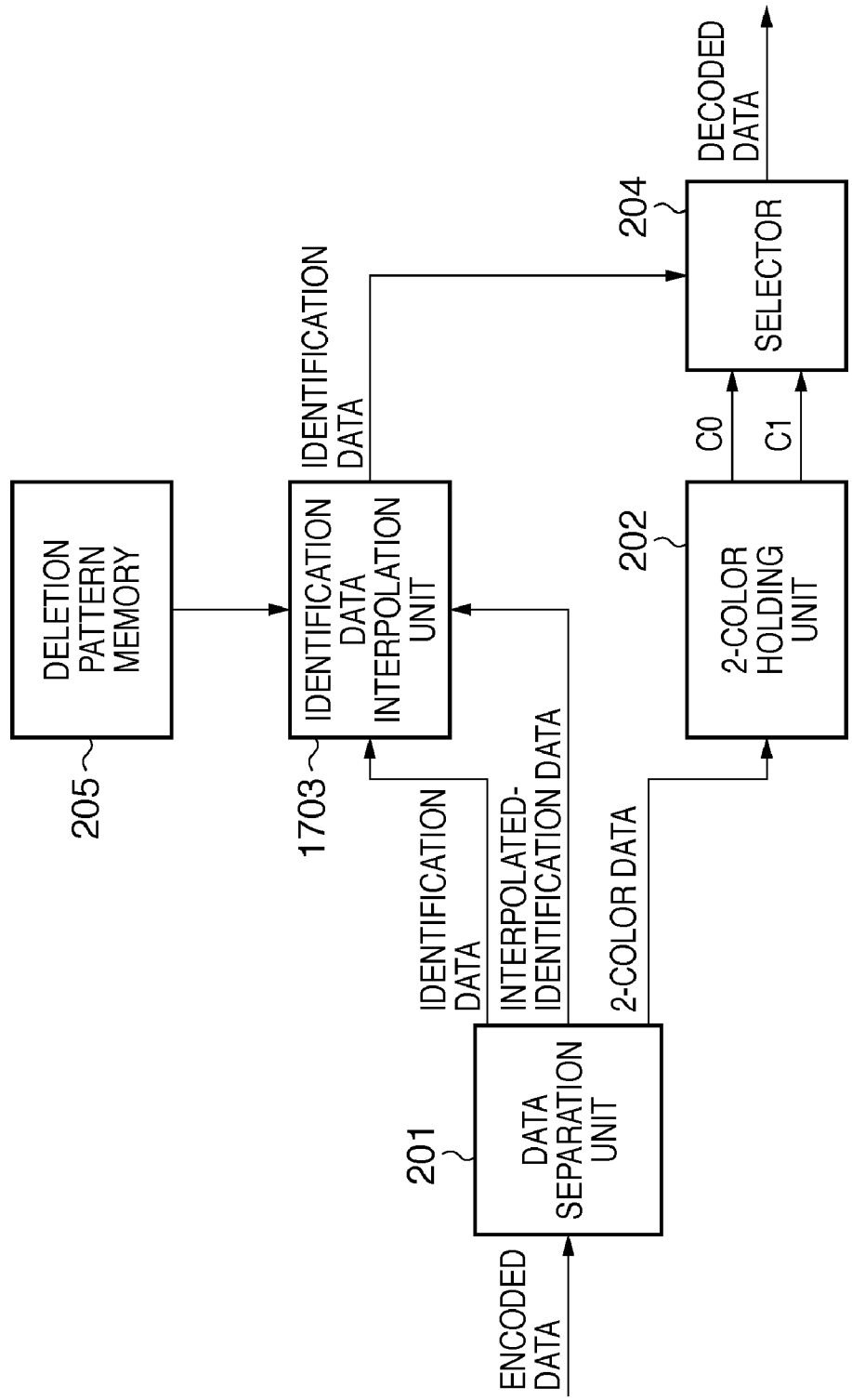

FIG. 18A
| | INPUT IDENTIFICATION DATA | OUTPUT IDENTIFICATION DATA |
|---|---|---|
| P001 |  |  |
| P101 |  |  |
| P102 |  |  |
| P201 |  |  |
| P202 |  |  |
| P203 |  |  |
| P204 |  |  |
| P205 |  |  |
| P206 |  |  |
| P301 |  |  |
| P302 |  |  |
| P303 |  |  |
| P304 |  |  |
| P305 |  |  |
| P306 |  |  |
| P307 |  |  |
| P308 |  |  |
| P309 |  |  |
| P310 |  |  |

FIG. 18B

| | INPUT IDENTIFICATION DATA | OUTPUT IDENTIFICATION DATA |
|---|---|---|
| P401 | | |
| P402 | | |
| P403 | | |
| P404 | | |
| P405 | | |
| P406 | | |
| P407 | | |
| P408 | | |
| P409 | | |
| P410 | | |
| P411 | | |
| P412 | | |
| P413 | | |

FIG. 18C
| | INPUT IDENTIFICATION DATA | OUTPUT IDENTIFICATION DATA |
|---|---|---|
| P501 |  |  |
| P502 |  |  |
| P503 |  |  |
| P504 |  |  |
| P505 |  |  |
| P506 |  |  |
| P507 |  |  |
| P508 |  |  |
| P509 |  |  |
| P510 |  |  |
| P601 |  |  |
| P602 |  |  |
| P603 |  |  |
| P604 |  |  |
| P605 |  |  |
| P606 |  |  |
| P701 |  |  |
| P702 |  |  |
| P801 |  |  |

FIG. 19
| | INPUT IDENTIFICATION DATA | OUTPUT IDENTIFICATION DATA |
|---|---|---|
| P901 |  |  |
| P902 |  |  |
| P903 |  |  |
| P904 |  |  |
| P905 |  |  |
| P906 |  |  |
| P907 |  |  |
| P908 |  |  |
| P909 |  |  |
| P910 |  |  |

US 8,244,033 B2

IMAGE ENCODING APPARATUS, IMAGE DECODING APPARATUS, AND CONTROL METHOD THEREOF

BACKGROUND OF THE INVENTION

1. Field of the Invention

The present invention relates to encoding and decoding techniques of image data.

2. Description of the Related Art

Conventionally, a technique that segments an input image into blocks each having a predetermined size, and applying encoding to each segmented block image using orthogonal transformation is known. The encoding using orthogonal transformation is an effective compression method for a natural image. However, the encoding using orthogonal transformation cannot obtain a satisfactory result for an image including a character or line draw image since it causes mosquito noise and block distortions due to loss of high frequency components of an image.

In order to solve such a problem, intra-block 2-color processing has been proposed. In this processing, in an image where a resolution is more important than tonality such as an image including a character or line draw image, the resolution is maintained by approximating pixels in each block image by 2 colors. Japanese Patent Laid-Open No. 05-056282 is known as a technique that executes this 2-color processing. In 2 gray-level block approximation encoding described in this reference, pixels in a block image are considered as an 2-color image, and identification information is generated to identify each pixel as one of these 2 colors. Then, the identification information and 2-color pixel values are packed, thereby attaining encoding processing. For example, when a block size is 8×8 pixels, and image data of that block is encoded by the 2-color processing, data of all 64 bits are stored as identification information, and 8-bit data for 2 colors are stored as color data, thus outputting fixed-length encoded data of a total of 80 bits. Likewise, when a block size is 16×16 pixels, fixed-length encoded data of a total of 272 bits including 256-bit identification information, and 16-bit (=8 bits×2) color data is output.

However, compressed data is normally stored in an external memory or the like. However, access to this external memory is often made with 4 bytes×N (N is a power of 2). In the aforementioned related art, access efficiency is low. For example, for the 8×8 block size, it is desirable to output fixed-length encoded data of 64 bits. Also, for the 16×16 block size, it is desirable to output fixed-length encoded data of 256 bits.

SUMMARY OF THE INVENTION

The present invention provides a technique which encodes image data in which one pixel is expressed by a plurality of bits, and which generates encoded data having a fixed length of m×n bits or less for each block of m×n pixels while satisfactorily maintaining resolution information and color information that express a character or line draw image and the like, and decodes the encoded data.

In order to solve the aforementioned problems, for example, an image encoding apparatus according to the present invention comprises the following arrangement. That is, there is provided an image encoding apparatus for encoding image data in which one pixel is expressed by a plurality of bits to have blocks each including m×n pixels as a unit, and generating encoded data having a fixed length of L bits, which are not more than m×n bits, per block, the apparatus comprises: an input unit which inputs image data for respective blocks; an extraction unit which extracts representative colors C0 and C1 from image data of an input block of interest; a generating unit which generates identification data of m×n bits by assigning 1 bit indicating one of the representative colors C0 and C1 to which each of pixels in the block of interest is approximate, to each pixel; a memory unit which stores pattern data used to, when the number of bits required to specify the representative colors C0 and C1 is defined by N, delete {N+1} identification data elements from the identification data for one block generated by the generating unit and to specify deletion target pixel positions which are separated from each other by at least a distance of not less than one pixel; a determination unit which determines, according to the pattern data stored in the memory unit, which of identification data elements approximate to the representative color C0 and identification data elements approximate to the representative color C1 are deleted more, and generates determination data of 1 bit indicating the determination result; a correcting unit which corrects non-deletion target identification data which are located near deletion positions, according to the determination result of the determination unit; a deletion unit which deletes the {N+1} identification data elements from m×n identification data elements after correction by the correcting unit, with reference to the pattern data stored in the memory unit; and an output unit which couples data indicating the representative colors C0 and C1 extracted by the extraction unit, the determination data generated by the determination unit, and remaining identification data after deletion by the deletion unit, and outputs the coupled data as encoded data of the block of interest.

According to the present invention, not only encoded data having a fixed length of m×n bits or less for each block of m×n pixels can be generated from multi-value image data in which one pixel is expressed by a plurality of bits, and can be decoded, but also resolution information and color information that express a character or line draw image and the like can be satisfactorily maintained.

Further features of the present invention will become apparent from the following description of exemplary embodiments with reference to the attached drawings.

BRIEF DESCRIPTION OF THE DRAWINGS

FIGS. 7A to 7J are views showing patterns of reference pixels around a pixel of interest;

FIG. 17 is a block diagram showing the arrangement of an image decoding apparatus according to the third embodiment;

FIGS. 18A to 18C are views showing examples of replacing patterns used by the image encoding apparatus according to the third embodiment; and FIG. 19 is a view showing an example of replacing patterns used by the image decoding apparatus according to the third embodiment.

DESCRIPTION OF THE EMBODIMENTS

Embodiments according the present invention will be described in detail hereinafter with reference to the accompanying drawings.

An image encoding apparatus of an embodiment to be described below encodes multi-value image data in which one pixel is expressed by a plurality of bits for respective blocks each including m×n pixels. In this case, the apparatus generates encoded data having a fixed length of L bits, which are equal to or smaller than m×n bits, for each block. Furthermore, L is equal to or smaller than m×n, and is a maximum value of an integer multiple of 32.

First Embodiment

Figure 1:
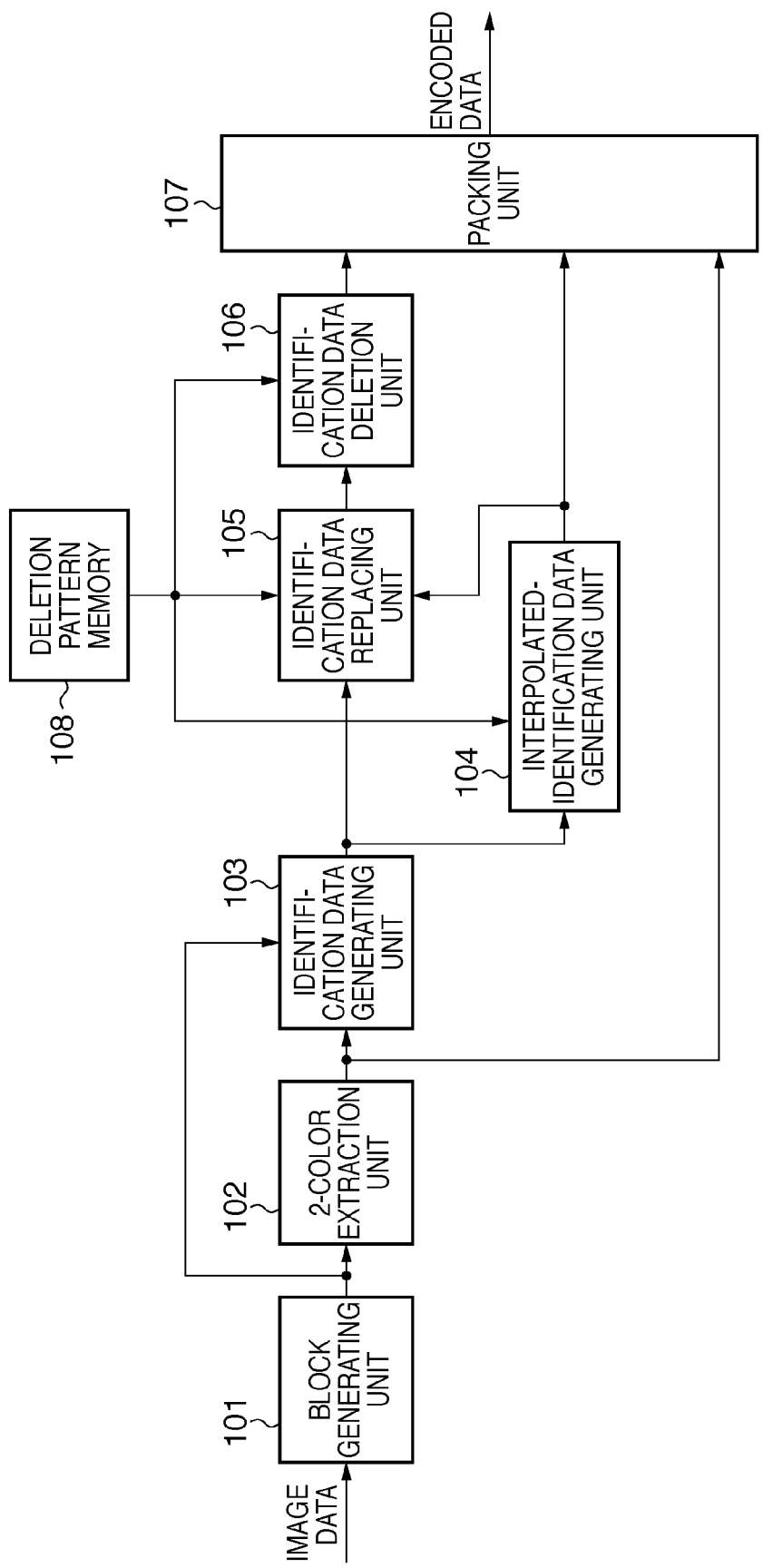
FIG. 1 is a block diagram showing the arrangement of an image encoding apparatus according to the first embodiment.

FIG. 1 is a block diagram showing the arrangement of an image encoding apparatus according to the first embodiment. This apparatus has a block generating unit 101, 2-color extraction unit 102, identification data generating unit 103, interpolated-identification data generating unit 104, identification data replacing unit 105, identification data deletion unit 106, packing unit 107, and deletion pattern memory 108. Assume that image data to be encoded input by the block generating unit 101 in this embodiment is uncompressed image data stored in a storage medium. However, the image data to be encoded may be an image scanned by an image scanner or may be image data acquired via communications (e.g., a network). Hence, the type of input source of the image data to be encoded is not limited to a specific one.

The block generating unit 101 segments an input image into blocks each having a predetermined size. The image data segmented into blocks are input to the 2-color extraction unit 102. The 2-color extraction unit 102 analyzes values of pixels in an input block of interest, and extracts two representative colors C0 and C1. The 2-color extraction unit 102 outputs the extracted representative colors C0 and C1 to the identification data generating unit 103 and packing unit 107. The identification data generating unit 103 determines to which of the two representative color data C0 and C1 each pixel in the block is approximate, and outputs identification data indicating to which of the two representative color data C0 and C1 the pixel is approximate for each pixel position to the interpolated-identification data generating unit 104 and identification data replacing unit 105. The interpolated-identification data generating unit 104 determines a value used to interpolate identification data which is deleted by the identification data deletion unit 106 (to be described later), and outputs the value to be interpolated to the packing unit 107 as interpolated-identification data. The identification data replacing unit 105 replaces identification data around a deletion target pixel with reference to the deletion pattern memory 108. The identification data deletion unit 106 deletes a plurality of identification data specified by a deletion pattern, and outputs remaining identification data to the packing unit 107. The packing unit 107 packs the two color data C0 and C1, interpolated-identification data, and identification data after the deletion processing, and outputs the packed data as fixed-length encoded data. Details of respective processing units will be described below.

The block generating unit 101 includes a buffer memory for m lines, receives image data to be encoded in a raster scan order, and stores the image data in the buffer. When image data for m lines is stored, the block generating unit 101 repeats processing for extracting image data defined by n pixels in the horizontal direction and m pixels in the vertical direction in turn, and outputting the extracted image data to the 2-color extraction unit 102. This image data of n×m pixels will be referred to as a pixel block hereinafter. The size (m, n) of this pixel block is not particularly limited. However, if the block size is large, the influence of deletion of identification data is reduced even when the number of identification data to be deleted is increased, but the influence of 2-color processing becomes large. Conversely, if the block size is small, since the number of colors included in a block of an input image becomes small due to correlation of an image, errors due to the 2-color processing are eliminated and accurate color preservation is facilitated, but the influence of deletion of identification data becomes large. The block shape need not be a square but may be a rectangle. In the description of this embodiment, assume that one pixel block size is 16×16 pixels (m=n=16). Of course, the user may set this size as needed. However, as can be seen from the following description, it is desirable that m×n is an integer multiple of "32". In this embodiment, a monochrome image in which one pixel is expressed by 8 bits (256 gray levels) will be exemplified for the sake of simplicity. However, the number of bits and color space may be changed as needed. A value expressed by 8 bits will be explained as "brightness". Therefore, a pixel represents a darker pixel (having a higher density) with decreasing pixel value, and represents a brighter pixel (having a lower density) with increasing pixel value. As can be seen from the above description, the representative colors C0 and C1 express different brightness values.

As described above, the block generating unit 101 outputs image data of 16×16 pixels (for respective pixel blocks) to the 2-color extraction unit 102.

The 2-color extraction unit 102 extracts two representative color data C0 and C1 (both are 8 bits) from one input pixel block. Assume that data having a smaller pixel value is color data C0, and that having a larger pixel value is color data C1. Note that a method of determining (extracting) the color data C0 and C1 of two colors is not particularly limited, but an example of the method is as follows.

Initially, the 2-color extraction unit 102 calculates an average value AVE of all pixels in one pixel block. Let P(x, y) be a pixel value at coordinates (x, y) in a block. Then, the average value AVE is given by:

$$AVE = \Sigma\Sigma P(i,j)/(16 \times 16)$$

where $\Sigma\Sigma$ indicates the integration of i, j=0, 1, ..., 15.

Next, the 2-color extraction unit 102 classifies respective pixels in a pixel block of interest into first and second groups using this average value AVE. That is, the unit 102 classifies the pixels into those which have pixel values equal to or smaller than the average value AVE (to be referred to as a group A hereinafter), and those which have pixel values larger than the average value AVE (to be referred to as a group B hereinafter). Then, the unit 102 determines the average value of the pixel values that belong to the group A as the color data C0, and that of the pixel values that belong to the group B as the color data C1.

The identification data generating unit 103 determines to which of the two color data C0 and C1 each pixel in an input block image is approximate. The unit 103 classifies all the pixels in the block into two groups, and outputs an identification data element used to identify one of the groups to which each pixel belongs. This identification data element per pixel can be 1 bit since it can identify one of the two groups to which one pixel belongs. The identification data generating unit 103 generates identification data elements as follows.

Threshold=AVE (average value of the overall block)

Identification data element=1 (when pixel value>threshold)

Identification data element=0 (when pixel value≦threshold)

Note that the threshold may be uniquely calculated by the identification data generating unit 103 or may use the calculation result of the 2-color extraction unit 102. Alternatively, the threshold may be given by {C0+C1}/2.

In this embodiment, assume that the identification data element of a pixel which belongs to the aforementioned group A is "0", and that of a pixel which belongs to the group B is "1".

The aforementioned processing is executed when the absolute value of the difference between the color data C0 and C1 is equal to or larger than a pre-set threshold.

When all the pixel values in the pixel block of interest are the same or when the absolute value of the difference between the colors of the color data C0 and C1 is equal to or smaller than the pre-set threshold (when the distance between the color data C0 and C1 on the color space is equal to or smaller than the threshold), only one color data (e.g., C0) is output as an extraction result. In this case, the other color data (C1) does not exist, but that color data (C1) is generated as a dummy. In this case, all identification data elements are "0".

In this embodiment, since one block size is 16×16 pixels, and the identification data element of one pixel is 1 bit, the identification data generating unit 103 consequently generates identification data of 256 bits (=16×16).

The interpolated-identification data generating unit 104 counts the numbers of "0"s and "1"s in association with identification data elements at positions where elements are to be deleted (to be referred to as deletion target positions hereinafter) with reference to deletion pattern data (to be simply referred to as a deletion pattern hereinafter) stored in the deletion pattern memory 108. The interpolated-identification data generating unit 104 then determines a larger count result based on the count results. The interpolated-identification data generating unit 104 outputs determination data as the determination result to the packing unit 107 and identification data replacing unit 105 as interpolated-identification data. The processing contents of this interpolated-identification data generating unit 104 will be described in more detail below.

Figure 5:
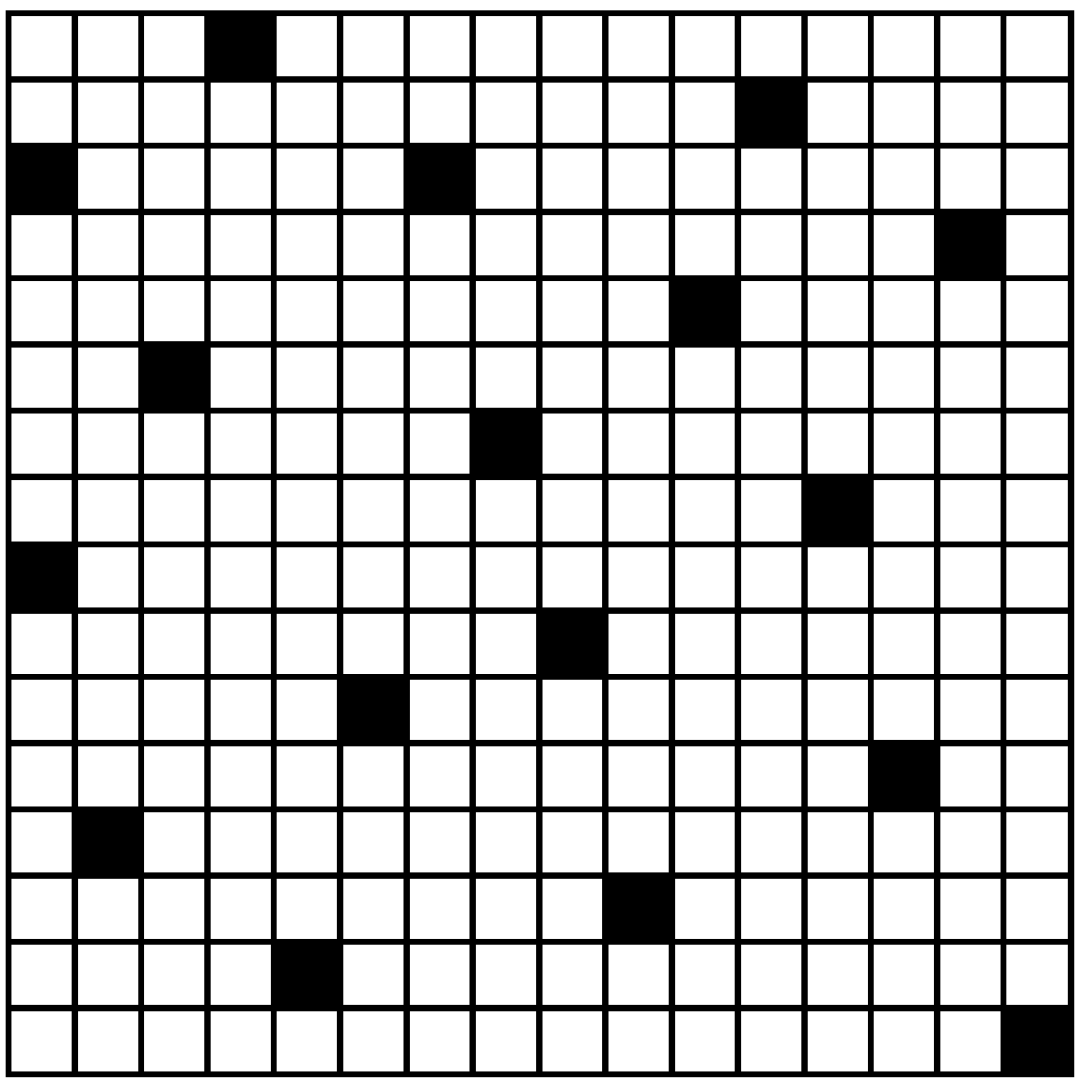
FIG. 5 is a view showing an example of a deletion pattern according to the first embodiment.

FIG. 5 shows a deletion pattern stored in the deletion pattern memory 108. This deletion pattern has a 16×16 size, which is the same as that of a pixel block as an encoding unit. A black part of the deletion pattern indicates a deletion position, and its value is "1". A white part is a non-deletion position, and its value is "0". As shown in FIG. 5, there are a total of 17 black parts (deletion positions), and the black parts are laid out to be separated by a distance of one or more pixels (three or more pixels in this embodiment), so as not to neighbor each other. Note that the distance here means the number of pixels included in a shortest route that traces from a certain pixel position to another pixel position in the horizontal or vertical direction.

The interpolated-identification data generating unit 104 counts the number I0 of identification data elements "0" at positions corresponding to "1" of the deletion pattern, and the number I1 of identification data elements "1" in the pixel block of interest. Then, the unit 104 outputs interpolated-identification data according to the following conditions.

Output "0" as interpolated-identification data when $I0 \geq I1$

Output "1" as interpolated-identification data when $I0 < I1$

To put plainly, the interpolated-identification data generating unit 104 determines which of the numbers of identification data elements "0" and "1" of the 17 identification data elements as deletion targets is larger, and outputs the value of the larger number of identification data elements as interpolated-identification data.

The identification data replacing unit 105 will be described below.

The identification data replacing unit 105 includes an appropriate buffer memory. The identification data replacing unit 105 receives the deletion pattern stored in the deletion pattern memory 108, identification data (256 bits in this embodiment) from the identification data generating unit 103, and interpolated-identification data from the interpolated-identification data generating unit 104, and stores them in the buffer memory. The identification data replacing unit 105 corrects and, more specifically, replaces the identification data, so as to reduce loss of the brightness of the entire pixel block of interest and to suppress image quality deterioration due to deletion of the identification data by the subsequent identification data deletion unit 106. Then, the identification data replacing unit 105 outputs replaced identification data stored in the buffer memory to the identification data deletion unit 106. A practical processing example of the identification data replacing unit 105 will be described below.

Let I(x, y) be an identification data element at coordinates (x, y) in the pixel block of interest, and D(x, y) be the value of the deletion pattern at that coordinate position. Both of I(x, y) and D(x, y) assume a value "0" or "1", and both of x and y assume a value ranging from 0 to 15. Also, a pixel position of the coordinates (x, y) will be referred to as a pixel position of interest hereinafter.

For the sake of simplicity, a case will be described wherein interpolated-identification data is "0". That is, this is the case when the number of identification data elements "0" to be deleted is equal to or larger than the number of identification data elements "1".

When $D(x,y)=0$:

The identification data replacing unit 105 does not change (correct) the identification data element I(x, y) at the pixel position (x, y) of interest in the internal buffer.

When $D(x,y)=1$ and $I(x,y)=0$:

The identification data replacing unit 105 does not change the identification data element I(x, y) at the pixel position (x, y) of interest in the internal buffer.

when $D(x,y)=1$ and $I(x,y)=1$:

This is the case when the identification data element at the deletion target position is "1". In this case, since an image decoding apparatus (to be described later) decodes the value of the deleted identification data element as interpolated-identification data "0", the brightness in the entire pixel block of interest is changed. Hence, the identification data replacing unit 105 executes the following processing to prevent the brightness of the block of interest from being changed, so as to replace (correct) an identification data element "0" of one pixel near the deletion target pixel position by "1", and output the replaced (corrected) identification data element. A determination criterion of the pixel position to be replaced is to select a pixel at a position where the density of identification data elements "1" is low. This processing will be described in more detail below.

FIGS. 6A to 6P to FIGS. 12A to 12D are views showing the relationship between the deletion target position and surrounding pixels in the pixel block of interest. In these figures, a black pixel position is the deletion target position, and a white position is a non-deletion target position. A hatched part is another neighboring pixel block, and FIGS. 7A to 7J to FIGS. 12A to 12D show cases in which a deletion target pixel is near the block boundary. When the neighboring pixel block is located on the upper or right side on the figure, each of patterns shown in FIGS. 7A to 7J to FIGS. 12A to 12D is appropriately rotated to match the positional relationship of the neighboring pixel block. That is, when the deletion target pixel is included in the uppermost line of the block, a pattern obtained by rotating a reference region in each of FIGS. 7A to 7J through 90° is adopted.

Figure 6D:
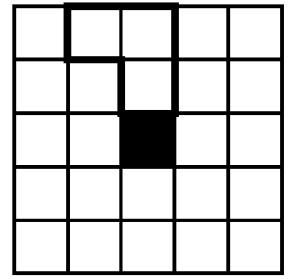
FIGS. 6A to 6P are views showing patterns of reference pixels around a pixel of interest.
Figure 6H:
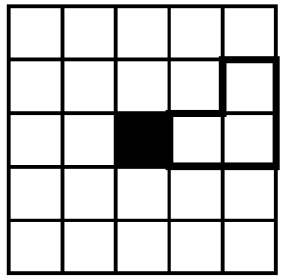
Figure 6C:
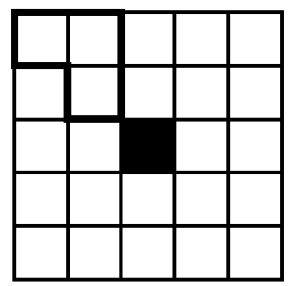
Figure 6G:
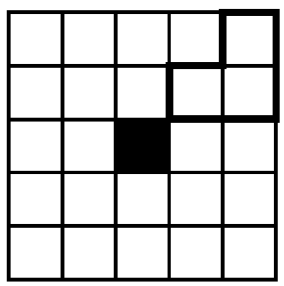
Figure 6B:
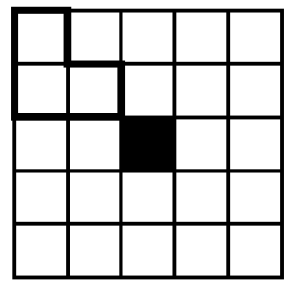
Figure 6F:
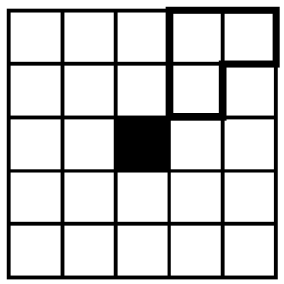
Figure 6A:
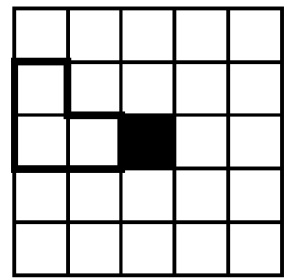
Figure 6E:
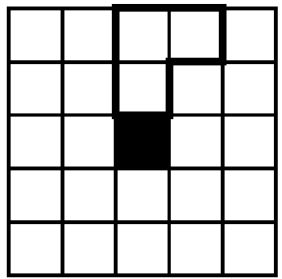
Figure 6L:
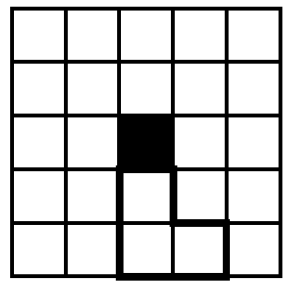
Figure 6K:
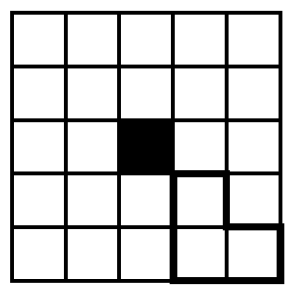
Figure 6J:
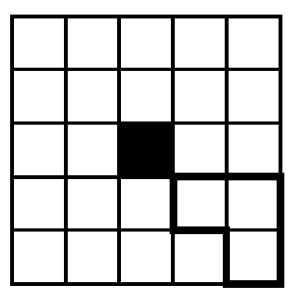
Figure 6I:
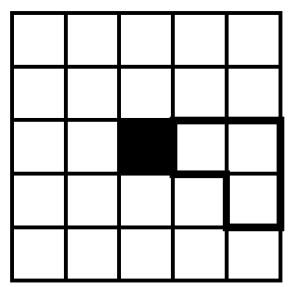
Figure 6P:
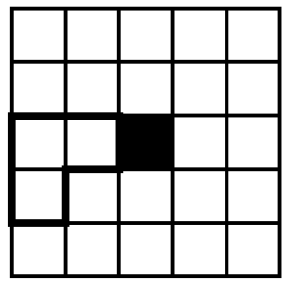
Figure 6O:
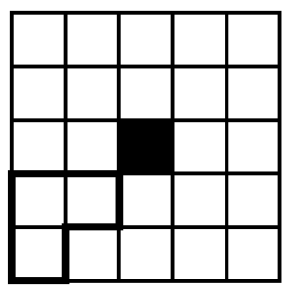
Figure 6N:
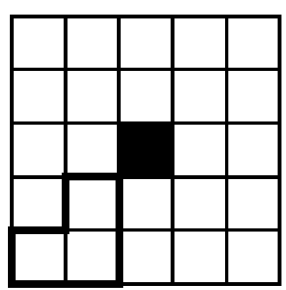
Figure 6M:
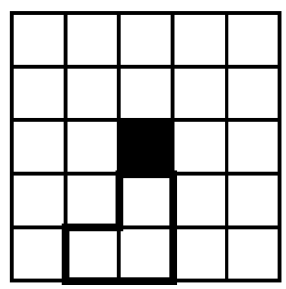
Figure 8A:
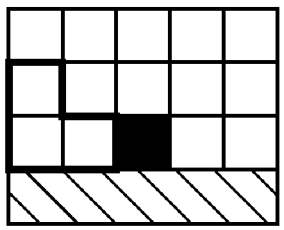
FIGS. 8A to 8H are views showing patterns of reference pixels around a pixel of interest.
Figure 8B:
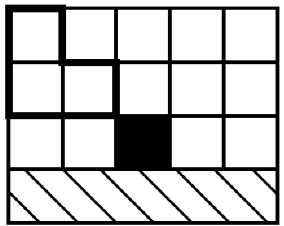
Figure 8C:
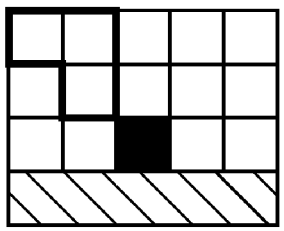
Figure 8D:
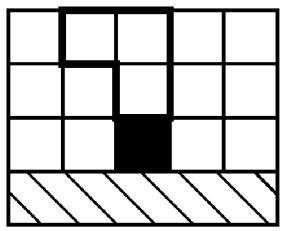
Figure 8E:
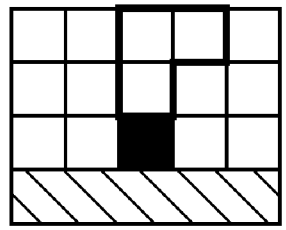
Figure 8F:
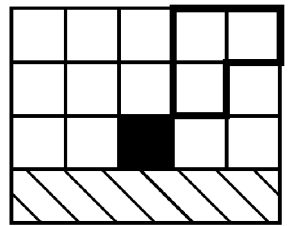
Figure 8G:
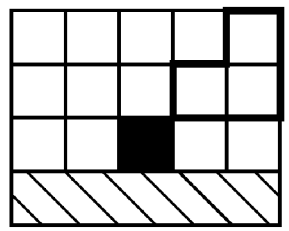
Figure 8H:
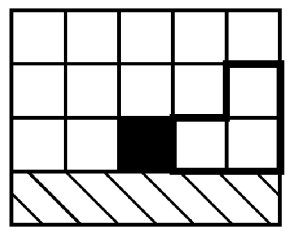
Figure 9A:
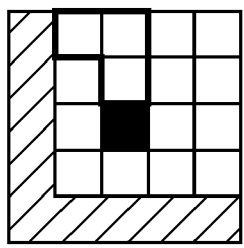
FIGS. 9A to 9F are views showing patterns of reference pixels around a pixel of interest.
Figure 9B:
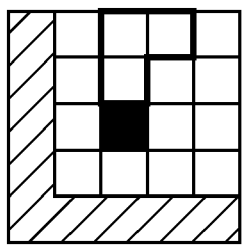
Figure 9C:
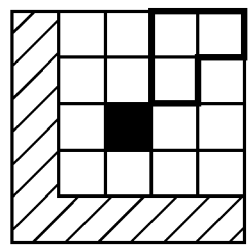
Figure 9D:
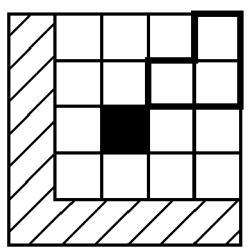
Figure 9E:
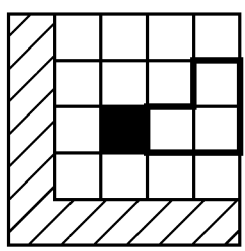
Figure 9F:
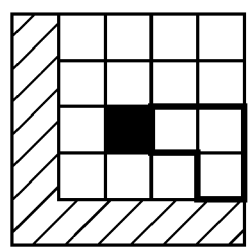
Figure 10A:
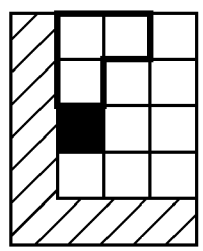
FIGS. 10A to 10E are views showing patterns of reference pixels around a pixel of interest.
Figure 10B:
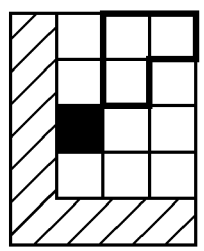
Figure 10C:
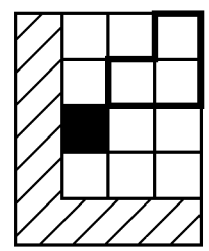
Figure 10D:
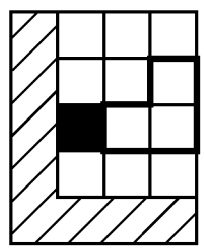
Figure 10E:
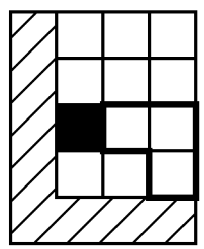
Figure 11A:
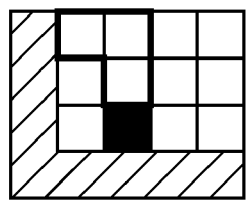
FIGS. 11A to 11E are views showing patterns of reference pixels around a pixel of interest.
Figure 11B:
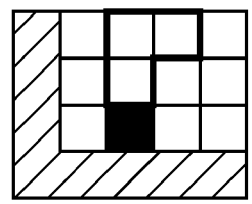
Figure 11C:
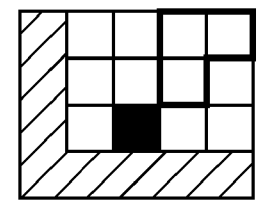
Figure 11D:
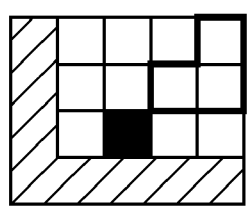
Figure 11E:
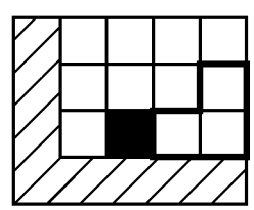
Figure 12A:
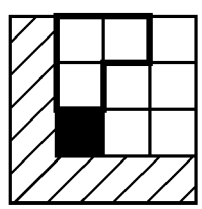
FIGS. 12A to 12D are views showing patterns of reference pixels around a pixel of interest.
Figure 12B:
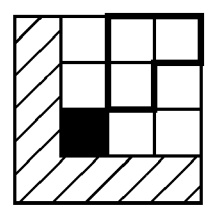
Figure 12C:
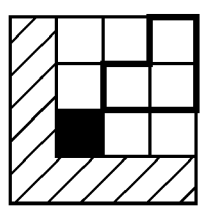
Figure 12D:
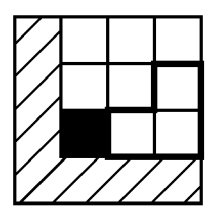
Figure 13A:
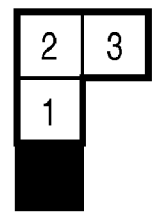
FIGS. 13A to 13D are views showing the replacing orders.
Figure 13B:
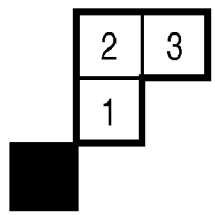
Figure 13C:
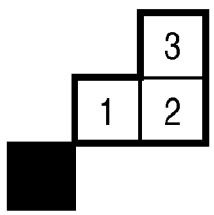
Figure 13D:
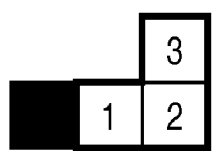

A part bounded by a bold frame is a comparison target region of the density of identification data. The shape of the bold frame is defined by combining one pixel of eight pixels which neighbor the deletion target pixel, and two continuous pixels which contact that one pixel (a total of three pixels). The bold frame parts created in this way are laid out radially from the deletion target pixel to detect the densities in the respective directions, as shown in FIGS. 6A to 6P, so that a pixel can be appropriately replaced in a direction of the lower density. Patterns including the neighboring blocks shown in FIGS. 7A to 7J to FIGS. 12A to 12D are obtained by excluding those in which the density cannot be detected due to the presence of the neighboring blocks from the patterns shown in FIGS. 6A to 6P.

In the sequence of determining a replacing pixel, it is determined based on the positional relationship of the neighboring block which of FIGS. 6A to 6P to FIGS. 12A to 12D the deletion target pixel matches. For example, when FIGS. 7A to 7J are selected, the numbers of identification data elements "1" in 10 different regions bounded by bold frames in these figures are counted, and a frame (region) with the smallest count value of "1" is selected from FIGS. 7A to 7J. If there is a plurality of frames with the smallest count value, a frame is randomly determined from them.

Then, identification data are checked in the order closer to the pixel of interest (black part) in the determined frame, as shown in FIGS. 13A to 13D, and a first position where an identification data element is "0" is changed by "1". However, when all surrounding pixels shown in FIGS. 13A to 13D are "1", a pixel is not changed.

The aforementioned sequence is executed for all the 17 deletion target positions in the deletion pattern to execute replacing processing of identification data elements.

When interpolated-identification data is "1", "0" is read as "1" in the above description.

Assume that a color with the larger number of identification data elements to be deleted of the representative colors C0 and C1 is defined as Ca, and a color with the smaller number of identification data elements to be deleted is defined as Cb. In short, only when the identification data element at the pixel position of interest indicates the color Cb, and when one identification data element indicating the color Ca as a non-deletion target is located in the neighborhood of the pixel position of interest, the interpolated-identification data generating unit 104 replaces the value of that identification data element at the neighboring position by the value of the identification data element indicating the color Cb.

The identification data deletion unit 106 deletes identification data element at positions with a value "1" (black parts in FIG. 5) of the deletion pattern of the 16×16 identification data elements with reference to the deletion pattern stored in the deletion pattern memory 108. The identification data deletion unit 106 outputs the remaining identification data elements after deletion to the packing unit 107.

The practical deletion processing of the identification data deletion unit 106 is as follows. Let I(x, y) be each of 16×16 identification data elements after the replacing processing using their coordinates (x, y), and D(x, y) be the value at the coordinates (x, y) in the deletion pattern.

When $D(x, y)=0$, the identification data deletion unit 106 outputs the input identification data element I(x, y) intact.

When $D(x, y)=1$, the identification data deletion unit 106 discards the input identification data element I(x, y), and does not output it.

As a result, identification data elements at the positions of $D(x, y)=1$ are not output. That is, 17 (17-bit) identification data elements are deleted. As a result, the number of identification data elements output from the identification data deletion unit 106 to the packing unit 107 is 239 (239 bits (=256−17)).

The packing unit 107 outputs encoded data having a fixed encoded data length="256" bits for one pixel block. Since both the representative color data C0 and C1 are 8-bit data, 16 bits are required to express these two color data. Also, 1 bit is required as the interpolated-identification data. For this reason, the identification data deletion unit 106 has to delete identification data elements for 17 pixels, and the number of black parts is 17 in this embodiment, as shown in FIG. 5.

The packing unit 107 holds the color data C0 and C1 (8×2 bits) output from the 2-color extraction unit 102, and the interpolated-identification data (1 bit) in that order, and couples 239-bit identification data from the identification data deletion unit 106 after these bits. The packing unit 107 outputs the coupled data as encoded data for one pixel block.

That is, the data structure of the encoded data for one pixel block output from the packing unit 107 is as follows.

Representative color C0 (8 bits)+C1 (8 bits)+interpolated-identification data (1 bit)+identification data (239 bits) after deletion processing Although out of sequence, the deletion pattern shown in FIG. 5 will be described below. In this embodiment, one deletion target position is basically included in one line and one column. However, since 17 values are to be deleted from the 16×16 size, it is impossible to set one deletion target position in each of all lines and columns, and some of these lines and columns include two deletion target positions. As can be also seen from FIGS. 6A to 6P to FIGS. 12A to 12D, the deletion target pixel positions are laid out to be separated by a certain distance, so as to prevent another deletion target pixel position from being located within the frame used to determine the pixel position to be replaced.

Figure 2:
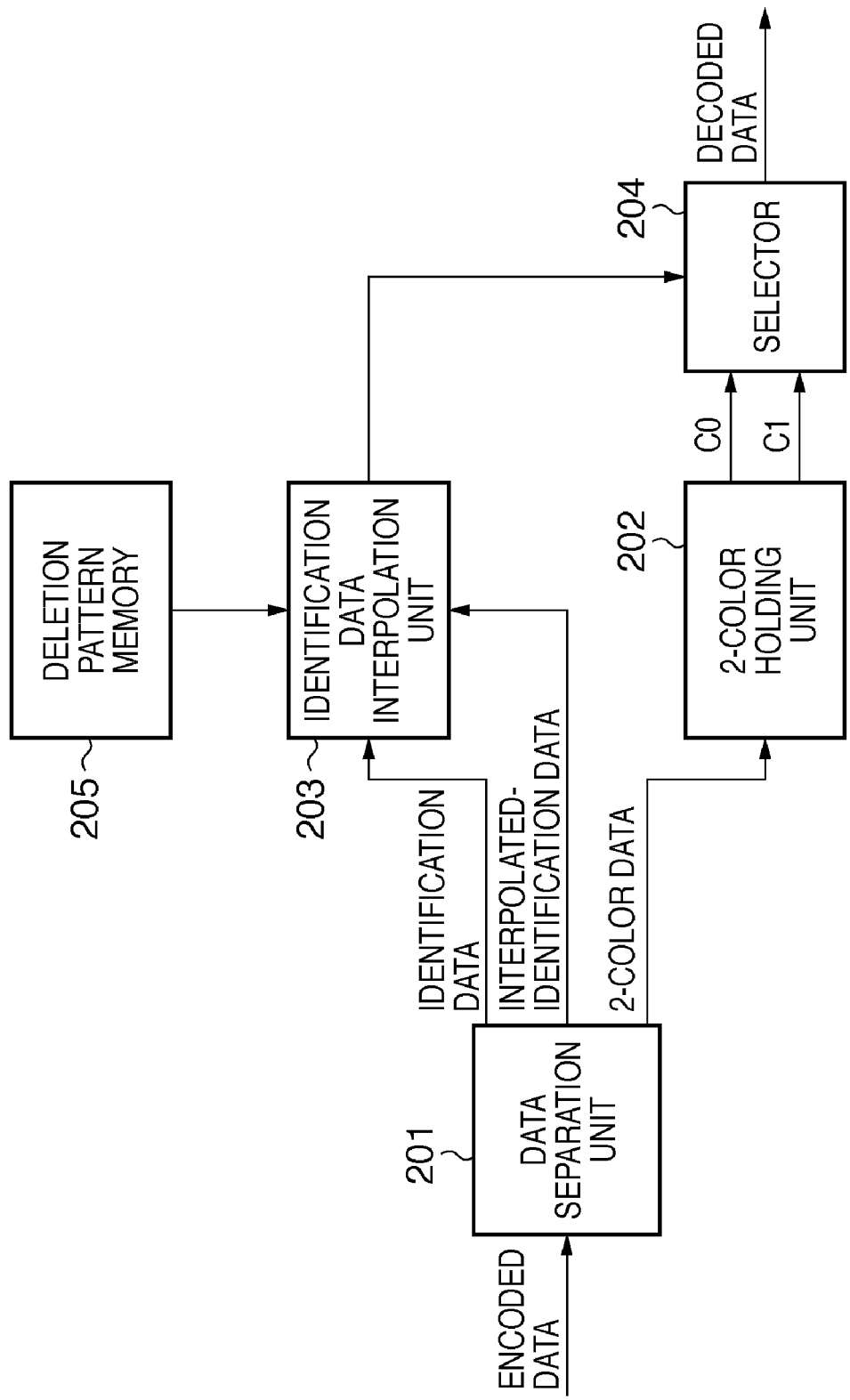
FIG. 2 is a block diagram showing the arrangement of an image decoding apparatus according to the first embodiment.

An image decoding apparatus for decoding the encoded data described in the embodiment will be described below. FIG. 2 is a block diagram showing the arrangement of an image decoding apparatus according to this embodiment. This apparatus includes a data separation unit 201, 2-color holding unit 202, identification data interpolation unit 203, selector 204, and deletion pattern memory 205. The deletion pattern memory 205 stores the same data as the deletion pattern data held by the aforementioned image encoding apparatus.

As described above, when the fixed length of encoded data for one block is specified by L bits, N bits indicating the representative colors C0 and C1 (N=16 in this embodiment)+ 1-bit interpolated-identification data+identification data of (L−1−N) bits (239 bits in this embodiment) surely line up in this order in the encoded data for one block.

Therefore, the data separation unit 201 receives fixed-length encoded data for one pixel block (256 bits in this embodiment) as a unit from encoded image data, and outputs first 16 bits to the 2-color holding unit 202 as the two representative color data C0 and C1 each expressed by 8 bits. The data separation unit 201 outputs 1-bit data at the 17th-bit position from the head of the encoded data for one pixel block to the identification data interpolation unit 203 as the interpolated-identification data. Also, the data separation unit 201 outputs 239-bit data after the 18th bit of the encoded data to the identification data interpolation unit 203 as the identification data after the deletion processing.

The 2-color holding unit 202 has two 8-bit registers, separates former 8 bits and latter 8 bits from the 16 bits supplied from the data separation unit 201, and holds them in these two registers as the color data C0 and C1. The respective registers keep outputting the color data C0 and C1 to the selector 204 until decoding processing for 16×16 pixels is completed.

The identification data interpolation unit 203 outputs an input identification data element intact at a position of an identification data element which is not deleted with reference to a deletion pattern stored in the deletion pattern memory 205. The identification data interpolation unit 203 outputs the interpolated-identification data at a position of a deleted identification data element. As a result, 256-bit identification data is generated from the input 239-bit identification data, and is output to the selector 204.

The selector 204 receives the 256-bit identification data from the identification data interpolation unit 203 bit by bit, i.e., for each identification data element. When the value of the input identification data element is "0", the selector 204 selects and outputs the color data C0 from the 2-color holding unit 202 as decoded pixel data. When the input identification data element is "1", the selector 204 selects and outputs the color data C1 from the 2-color holding unit 202 as decoded pixel data. In this way, image data of a pixel block including 16×16 pixels is decoded.

The processing contents of the image encoding apparatus and decoding apparatus according to the first embodiment have been described. According to the first embodiment, encoded data having a fixed length of 256 bits, i.e., a data size which is an integer multiple of 32 bits and is advantageous for access can be generated from image data including 16×16 pixels. Therefore, the image decoding apparatus can also decode, for example, only pixel blocks at positions designated by the user.

Second Embodiment

The first embodiment has exemplified the case in which the image encoding apparatus and decoding apparatus commonly use one interpolated-identification data as deleted identification data. The second embodiment will exemplify a case in which the need for encoding interpolated-identification data is obviated by determining the interpolated-identification data to be a predetermined value which is set in advance, thereby reducing the number of identification data to be deleted accordingly.

A case will be examined below wherein deleted identification data elements are interpolated by interpolated-identification data. Upon decoding an image intended to be printed, it is considered that disappearance of a dot at a position where a dot is to exist has a lighter influence on the image quality than appearance of a dot at a position where a dot is not to exist. For example, when all interpolated data are set to be "0" (pixels on the low brightness side), dots are generated on a white background, thus posing a problem. However, when all interpolated data are set to be "1" (pixels on the high brightness side), although the density of a solid part lowers slightly, since interpolated pixels are dispersed, they nearly cannot be discriminated in terms of image quality due to a dot gain and the like. In consideration of these points, this embodiment can handle interpolated-identification data as a high-brightness pixel (low-density pixel), i.e., as "1" since the brightness is taken as an example.

Assume that both of two color data C0 and C1 are expressed by 8 bits as in the first embodiment. Therefore, the two color data C0 and C1 require a total of 16 bits (=8+8). Assuming that the fixed length of encoded data is defined by 256 bits, 16 bits of the 256-bit identification data need only be deleted. Therefore, in the second embodiment, there are 16 deletion target positions (black parts), as exemplified in FIG. 14.

Figure 3:
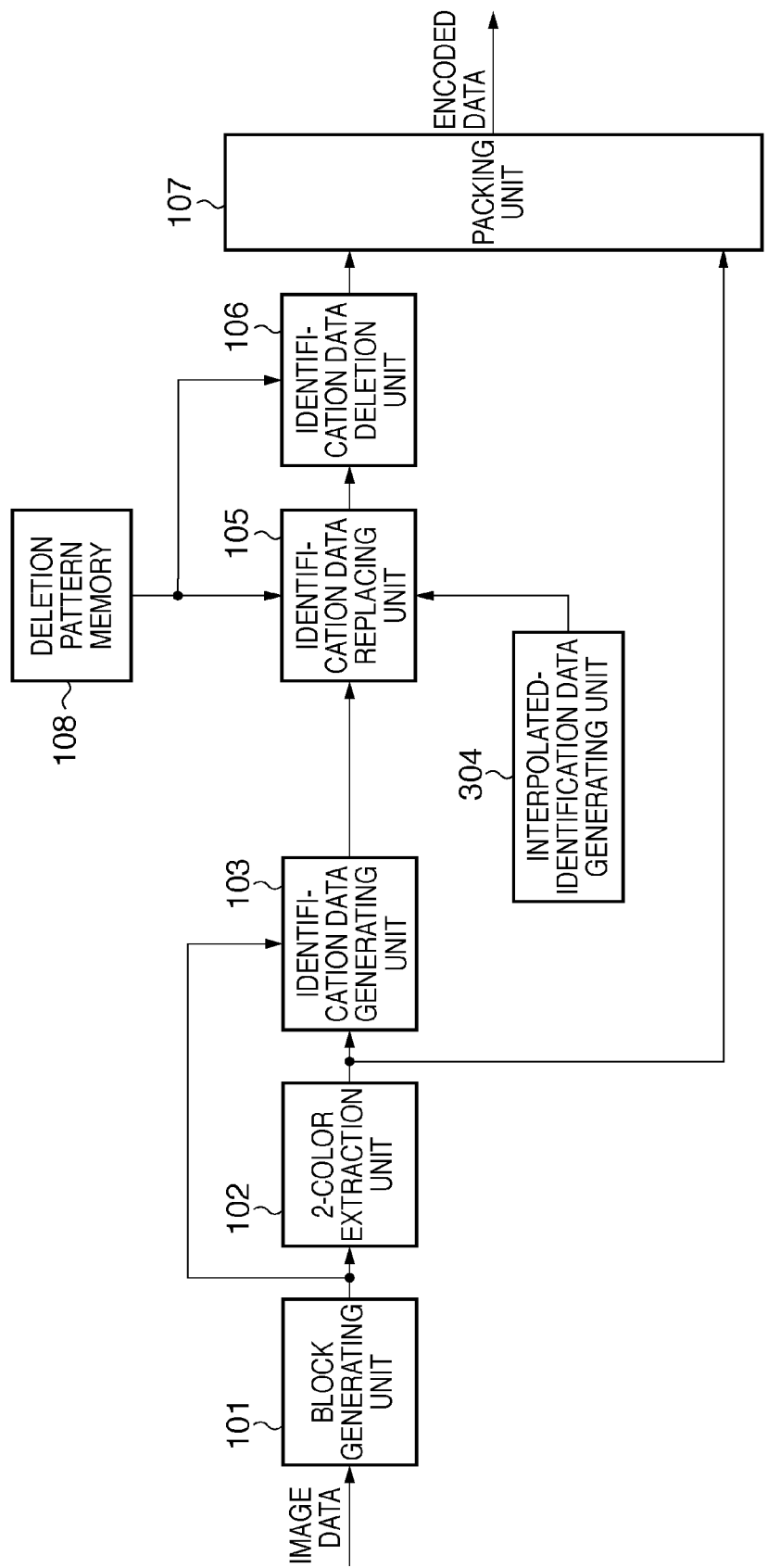
FIG. 3 is a block diagram showing the arrangement of an image encoding apparatus according to the second embodiment.

FIG. 3 shows the arrangement of an image encoding apparatus of the second embodiment. Differences between FIGS. 3 and 1 are that identification data from the identification data generating unit 102 and deletion pattern data from the deletion pattern memory 108 are not supplied to an interpolated-identification data generating unit 304, and interpolated-identification data from the interpolated-identification data generating unit 304 is not supplied to a packing unit 107. Also, the interpolated-identification data generating unit 304 supplies fixed interpolated-identification data "1" to the identification data replacing unit 105. Therefore, only processes of these units will be explained below.

In case of the second embodiment, the processing contents of the identification data deletion unit 106 are the same as those in the first embodiment. However, since the number of deletion target identification data elements indicated by a deletion pattern stored in the deletion pattern memory 108 is 16, the number of identification data elements (the number of bits) output from the identification data deletion unit 106 is 240 (240 bits).

The interpolated-identification data generating unit 304 keeps outputting interpolated-identification data "1" unlike the interpolated-identification data generating unit 104 of the first embodiment.

The packing unit 107 holds the color data C0 and C1 (8×2 bits) output from the 2-color extraction unit 102 in that order, and couples 240-bit identification data from the identification data deletion unit 106 after these bits. The packing unit 107 outputs the coupled data as encoded data for one pixel block.

Figure 4:
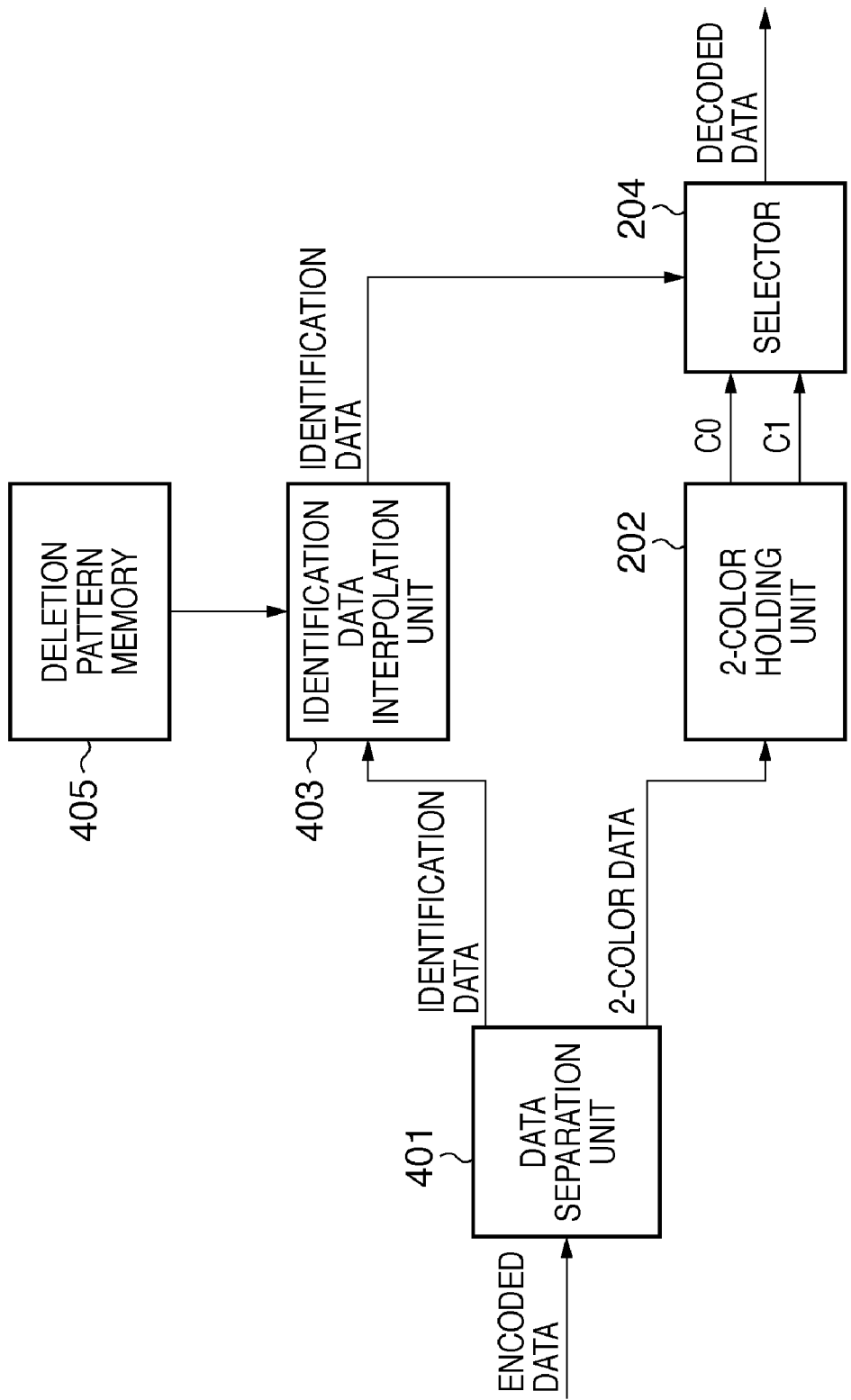
FIG. 4 is a block diagram showing the arrangement of an image decoding apparatus according to the second embodiment.

On the other hand, an image decoding apparatus has the arrangement shown in FIG. 4. The arrangement shown in FIG. 4 is different from that of the first embodiment shown in FIG. 2 in that a signal line of interpolated-identification data disappears between a data separation unit 401 and identification data interpolation unit 403. The processes of the data separation unit 401 and identification data interpolation unit 403 are different from the first embodiment. Hence, only the processes of these two units will be described below.

The data separation unit 401 receives fixed-length encoded data for one pixel block (256 bits in this embodiment) as a unit from encoded image data, and outputs first 16 bits of the encoded data to the 2-color holding unit 202 as the two representative color data C0 and C1 each expressed by 8 bits. Also, the data separation unit 401 outputs 240-bit data after the 17th bit to the identification data interpolation unit 403 as identification data.

Figure 14:
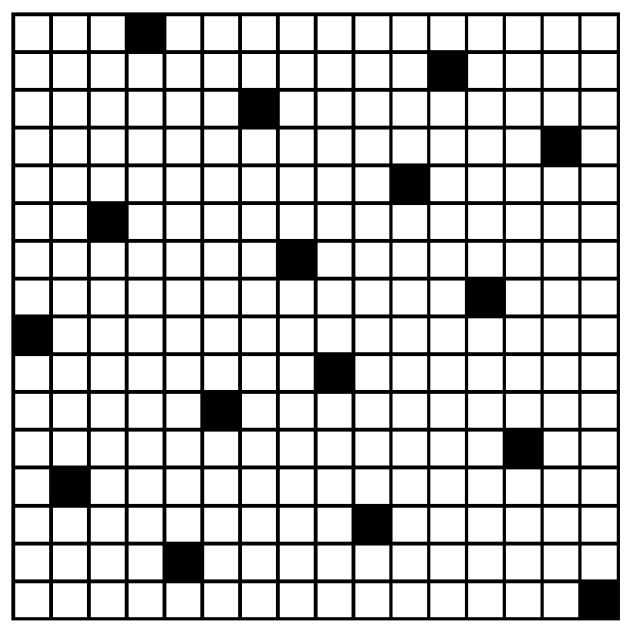
FIG. 14 is a view showing an example of a deletion pattern according to the second embodiment.

The identification data interpolation unit 403 refers to a deletion pattern memory 405 (which stores the deletion pattern shown in FIG. 14). When the pixel position of interest is not a deletion target, the identification data interpolation unit 403 outputs an identification data element input from the data separation unit 401 intact to the selector 204. On the other hand, when the identification data interpolation unit 403 determines that the pixel position of interest is a deletion target, it outputs identification data "0" which is set in advance to the selector 204.

As described above, according to the second embodiment, since interpolated-identification data is determined in advance, the precision of identification data to be decoded by the decoding apparatus can be improved. As a result, the reproducibility of an image can be further improved.

Third Embodiment

The first and second embodiments have explained the 2-color processing which maintains the brightness of an image by replacing an identification data element at the deletion target position by the value of an identification data element of a surrounding pixel in the encoding apparatus. As a result, a change in brightness before and after encoding is none or small. However, since the position of an identification data element is moved, the shape of an edge of a character or line draw image is likely to be changed. Hence, the third embodiment will exemplify a case in which a decoding apparatus restores identification data that have undergone replacing processing in an encoding apparatus, thereby preserving both the brightness and shape as much as possible.

Figure 16:
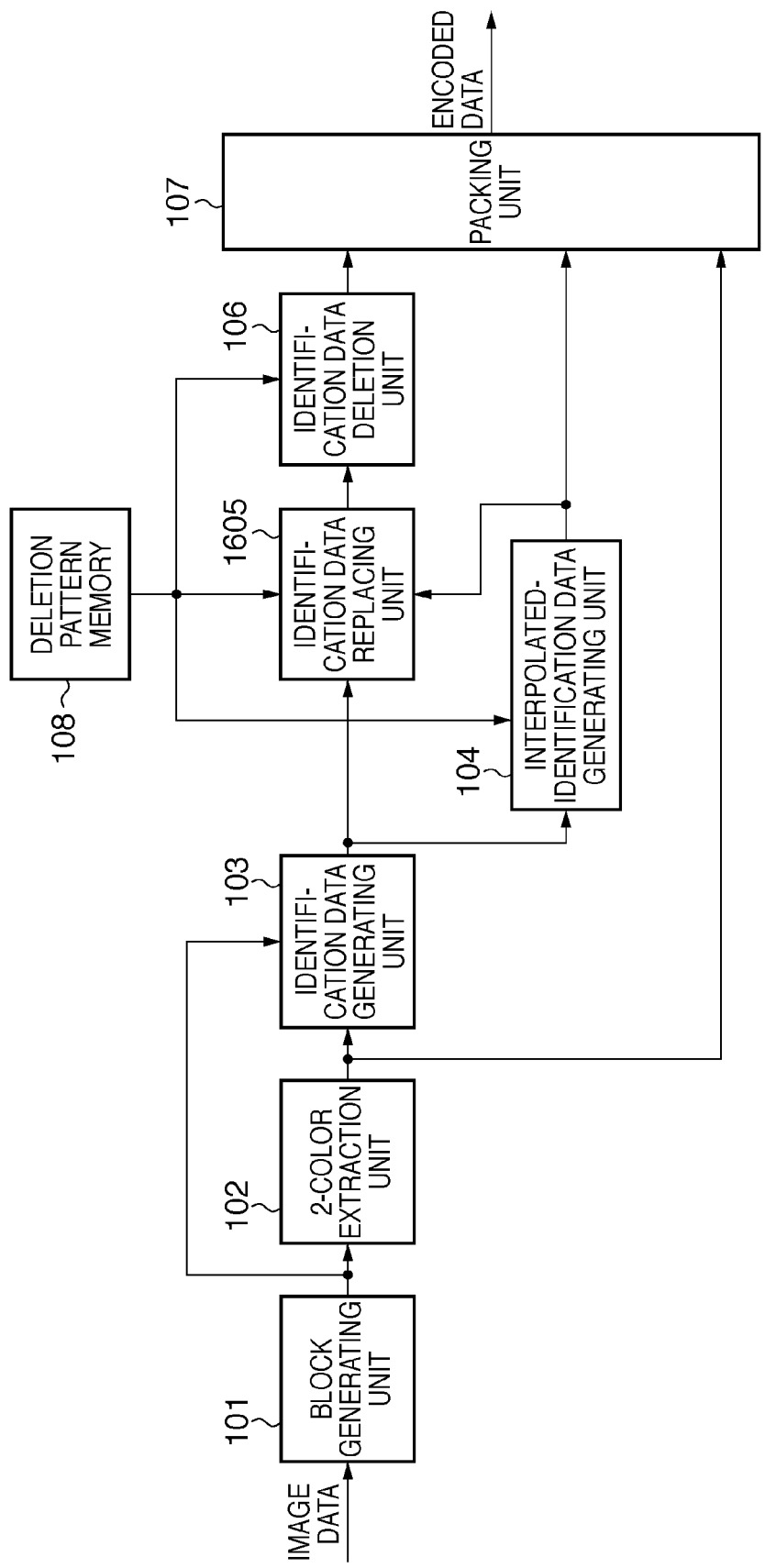
FIG. 16 is a block diagram showing the arrangement of an image encoding apparatus according to the third embodiment.

FIG. 16 shows the arrangement of an image encoding apparatus according to the third embodiment. Only a difference between FIGS. 16 and 1 is that the operation of an identification data replacing unit 1605 is different from that of the identification data replacing unit 105, and other components are the same as those in the first embodiment. Hence, only the identification data replacing unit 1605 in the third embodiment will be explained below.

The identification data replacing unit 1605 includes a buffer memory as in the identification data replacing unit 105. The identification data replacing unit 1605 receives the deletion pattern stored in the deletion pattern memory 108, identification data from the identification data generating unit 103, and interpolated-identification data from the interpolated-identification data generating unit 104, and stores them in the buffer memory. The identification data replacing unit 1605 then applies replacing processing to the identification data, and outputs the replaced identification data stored in the buffer memory to the identification data deletion unit 106. A practical processing example of the identification data replacing unit 1605 will be described below.

FIGS. 18A to 18C show pairs of identification data patterns of 3×3 pixels each including a deletion target position as the center when interpolated-identification data is "0", and identification data patterns after replacing processing. A pair of an input identification data element pattern of 3×3 pixels and that after the replacing processing shown in FIGS. 18A to 18C is specified in the form of a pattern number "P### (# is a numeral)" in FIGS. 18A to 18C.

Since the replacing processing is applied to an identification data element="1" at the deletion target position (the central position of 3×3 pixels), FIGS. 18A to 18C do not show any patterns including identification data="0" at the central position. That is, a black pixel indicates identification data "1", and a white pixel indicates identification data "0". Patterns which become the same after rotation or reversal are illustrated all together. Note that reversal means to form a mirror image, but it does not mean to invert identification data "0" to "1". When the interpolated-identification data is "1", a black pixel indicates identification data "0", and a white pixel indicates identification data "1" in the following description.

Respective conditions will be described below. It is checked in ascending order of condition number to be described below if all pixels of identification data elements "0" which neighbor the deletion target position in each of FIGS. 18A to 18C meet a condition. If only one pixel position satisfies the condition, that pixel position is determined as a replacing pixel position. If a plurality of positions that satisfies the condition remains, all the remaining positions have a symmetric positional relationship, and there is no stochastic difference in replacing effect when any of these positions is selected, an arbitrary one of these candidate positions can be selected as a replacing pixel position. If there is no position that satisfies the condition, the replacing pixel position is determined with reference to a condition with the next smallest condition number.

Condition "1"=determine identification data element "0" as replacing target position:

This condition is set to replace a surrounding identification data element "0" by an identification data element "1" at the deletion target position for the purpose of preventing a change in brightness as a result of encoding. For example, when there is only one identification data element "0" like in a pattern P702 in FIG. 18C, it is uniquely determined to replace that identification data element.

Upon examining a pattern P606 in FIG. 18C, even when either of two, upper left and lower right identification data elements "0" in an input identification data element pattern is replaced by "1", there is no stochastic difference in effect for an image. In such case, either of these identification data elements may be selected. Therefore, in case of the pattern P606 in FIG. 18C, in a replaced pattern, the identification data element at the lower right corner position is replaced by "1". However, the position to be replaced by "1" may be the upper left corner position.

However, by way of exception, when there is no identification data element "0" like in a pattern P801 in FIG. 18C, identification data is left unchanged.

Condition "2"=determine replacing target position from positions in upper, lower, right, and left directions with respect to deletion target position:

This condition "2" is set to replace, by "1", an identification data element "0" in the upper, lower, right, or left direction in preference to those in oblique directions with respect to the deletion target position. For example, upon examining a pattern P506 in FIG. 18C, there are three identification data elements "0", and it is uniquely determined based on the condition "2" to replace an identification data element of a left neighboring pixel of the pixel of interest by "1".

Upon examining a pattern P403 in FIG. 18B, there are four identification data elements "0", and these elements are limited to upper and left neighboring elements based on the condition "2". Note that the pattern P403 in FIG. 18B shows a state in which a pixel above the deletion target position is selected as a replacing target, but the left neighboring pixel may be selected.

Condition "3"=avoid continuation of three or more identification data elements "1" after replacement:

This condition is set to avoid generation of new continuity, which is not originally included in an image, as a result of replacement. For example, upon examining a pattern P409 in FIG. 18B, replacing target positions are limited to two, i.e., upper and lower neighboring positions of the deletion target position based on the conditions "1" and "2", but it is uniquely determined based on the condition "3" to replace an identification data element "0" located above the deletion target position by "1".

Upon examining a pattern P309 in FIG. 18A, there are five identification data elements "0". These identification data elements are limited to two, i.e., upper or lower and right neighboring elements of the deletion target position based on the condition "2". Then, the upper or lower neighboring position is determined based on the condition "3". In the example of the pattern P309 in FIG. 18A, the replacing target position is a position below the pixel of interest. However, the position above the pixel of interest may be selected.

Condition "4"=determine, as replacing target position, position where "1" exists at opposite side of deletion target position:

This condition is set to maintain continuity of two consecutive identification data elements which are originally included in an input image. For example, upon examining an input pattern indicated by a pattern P404 in FIG. 18B, two identification data "1" consecutively appear from the right to the center. In this case, when left neighboring identification data "0" of the deletion target position is replaced, "1" appears at an opposite position of the deletion target position. Therefore, the left neighboring position of the deletion target position satisfies this condition. Also, since the lower right corner is "1", the upper left neighboring pixel position of the deletion target position also satisfies this condition. However, other positions do not satisfy the condition "4". The left and upper left neighboring positions of the deletion target position also satisfy the condition "3". The upper left neighboring position of the deletion target position does not satisfy the condition "2". Therefore, it is uniquely determined to replace identification data "0" at the left neighboring position of the deletion target position by "1".

For example, upon examining a pattern P504 in FIG. 18C, the right, left, and lower neighboring positions of the deletion target position satisfy the conditions "1" and "2", but there is no position that satisfies the condition "3". In this case, the condition "4" with the next smallest condition number is referred to. The lower neighboring position of the deletion target position satisfies the condition "4", and the right and left neighboring positions of the deletion target position do not satisfy the condition "4". Therefore, it is uniquely determined to replace an identification data element "0" at the lower neighboring position of the deletion target position by "1".

Condition "5"=determine, as replacing target position, position that does not disturb formation of three consecutive identification data elements "0":

This condition is set to maintain continuity of three consecutive identification data elements "0" which are originally included in an input image. For example, upon examining a pattern P301 in FIG. 18A, three consecutive identification data elements "0" are formed in the left column. The left and upper neighboring positions satisfy the conditions "1" to "4", but only the neighboring upper position can satisfy the condition "5". Therefore, in this case, it is uniquely determined to replace the upper identification data element "0" by "1".

Upon examining a pattern P102 in FIG. 18A, four, i.e., upper, lower, right, and left identification data satisfy the conditions "1" to "4", but only the upper and right data satisfy the condition "5". Either of these data may be selected. Therefore, the pattern P102 in FIG. 18A shows a state in which the upper neighboring position of the deletion target position is selected, but the right neighboring position may be selected.

The replacing method using replacing pattern data shown in FIGS. 18A to 18C has been described. More specifically, the identification data replacing unit 1605 according to the third embodiment has a replacing pattern memory unit which stores a replacing pattern data table shown in FIGS. 18A to 18C, and executes replacing processing with reference to that table.

As can be seen from the above description, when interpolated-identification data is "0", and when the position of the pixel of interest is a deletion position, and an identification data element of the pixel of interest is "1" (non-interpolated-identification data), one identification data element which has the smallest influence of identification data elements "0" of identification data of eight pixels that neighbor the identification data element of interest is replaced by "1". Since the identification data element to be replaced is located at least at the neighboring position of the pixel of interest, the influence imposed on image quality is small. Furthermore, according to this embodiment, since an identification data element at a position having the smallest influence of neighboring pixels is replaced according to the aforementioned conditions, the influence can be further reduced.

Note that the case has been explained when interpolated-identification data is "0". However, when interpolated-identification data is "1", "0" is read as "1" in the above description.

Furthermore, according to the third embodiment, even an image decoding apparatus side can further improve image quality. FIG. 17 is a block diagram showing the arrangement of an image decoding apparatus according to the third embodiment.

A difference between FIGS. 17 and 2 is that new processing which is not included in the identification data interpolation unit 203 is added to an identification data interpolation unit 1703. Therefore, the identification data interpolation unit 1703 outputs deleted identification data elements as interpolated-identification data basically as in the identification data interpolation unit 203 in the first embodiment.

The identification data interpolation unit 1703 includes a buffer memory. The unit 1703 receives identification data and interpolated-identification data as inputs, and stores them in the internal buffer memory. The unit 1703 executes interpolation processing with reference to a deletion pattern stored in the deletion pattern memory 205, and outputs identification data after interpolation. However, in the third embodiment, exception processing is executed. This exception processing will be described below.

In this case as well, assume that input interpolated-identification data is "0" for the sake of simplicity. FIG. 19 shows pair relationships between input identification data elements and output identification data elements in the exception processing. The left column in FIG. 19 indicates input identification data element patterns of 3×3 pixels, and the right column indicates identification data element patterns after interpolation. A white pixel indicates an identification data element "0", and a black pixel indicates an identification data element "1". A hatched part indicates a deleted identification data element. Since the exception processing is executed when an identification data element at the pixel position of interest is deleted, the hatched part is located at the center of each identification data element pattern of 3×3 pixels.

Note that patterns which become the same as identification data shown in FIG. 19 after rotation or reversal are illustrated all together. When input interpolated-identification data is "1", a white pixel is read as identification data "1", and a black pixel is read as identification data "0".

According to the first embodiment, an identification data element at the deletion position in FIG. 19 is output as interpolated-identification data "0". According to the third embodiment, when an identification data element at the pixel position of interest is deleted, and interpolated-identification data "0" is output, it is replaced by identification data with a value "1", which is located at the neighboring pixel position and has a polarity different from the interpolated-identification data.

The identification data interpolation unit 1703 of the third embodiment exchanges an identification data element "1" which satisfies all of the following four conditions by interpolated-identification data ("0" in this embodiment).

Condition 1: An identification data element "1" at the pixel position of interest is located at any of the upper, lower, right, and left neighboring positions of the deletion position.

Condition 2: An identification data element "1" at the pixel position of interest is not a member of three consecutive identification data elements "1" in the horizontal or vertical direction.

Condition 3: If an identification data element "1" at the pixel position of interest is replaced by "0", and the central position of 3×3 pixels is interpolated by interpolated-identification data "1", identification data at the central position becomes a member of three consecutive identification data elements "1" in any of the upper, lower, right, left, and oblique directions.

Condition 4: There are no other identification data elements that satisfy conditions 1 to 3 except for an identification data element "1" at the pixel position of interest.

Condition 1 is set since the upper, lower, right, or left neighboring position is preferentially selected as a replacing target in the encoding apparatus. Condition 2 is set to maintain continuity since priority of replacement to form three consecutive elements is low in the encoding apparatus, and such continuity is likely to be originally included in an image. Condition 3 is set for the purpose of restoring only an image including continuity. Condition 4 is set to avoid any restoration error due to the presence of a plurality of candidates.

For example, upon examining a pattern P901 in FIG. 19, there are three identification data elements "1" at the upper left, upper, and lower right neighboring positions of the deletion position. Of these positions, only the upper neighboring position of the deletion position satisfies condition 1. Identification data "1" at the upper neighboring position satisfies condition 2 since it does not form three consecutive data "1" in the upper line. The identification data at the position above the deletion position satisfies condition 3 since it forms three consecutive data "1" in the oblique direction when it is replaced to the deletion target position. The identification data element at the position above the deletion position satisfies condition 4 since there are no identification data elements "1" that satisfy conditions 1 to 3 other than that identification data element. That is, since the identification data element at the position above the deletion position satisfies all conditions 1 to 4, it is replaced by the deletion target position, thus obtaining an identification data element pattern of 3×3 pixels indicated on the right side of the pattern P901 in FIG. 19. Remaining patterns P902 to P910 in FIG. 19 are similarly obtained.

The interpolation method on the decoding apparatus side according to the third embodiment has been explained.

An example of effects obtained using the image encoding apparatus and decoding apparatus according to the third embodiment will be described below. For example, assuming that identification data elements in the left column of a pattern P406 in FIG. 18B are input, the encoding apparatus outputs these input identification data elements as those in the right column of the pattern P406 in FIG. 18B. Upon reception of these identification data elements, the decoding apparatus can determine that the input identification data elements are those obtained by vertically reversing a pattern in the left column of a pattern P909 in FIG. 19. Therefore, the decoding apparatus outputs identification data elements obtained by vertically reversing a pattern in the right column of the pattern 909 in FIG. 19. As described above, even after a series of encoding processes, the shape of identification data elements remains unchanged before and after encoding.

The processing contents of the image encoding apparatus and decoding apparatus according to the third embodiment have been described. According to the encoding apparatus and decoding apparatus of the third embodiment, in addition to the effect of maintaining the brightness described in the first and second embodiments, the shape of an image with high continuity can also be preserved. Therefore, image encoding with higher image quality can be attained.

Fourth Embodiment

The first, second, and third embodiments described above have exemplified the case in which two representative colors are extracted from each pixel block, and the number of identification data each indicating one of the representative colors, to which each pixel in the pixel block is approximate, is reduced, thereby generating fixed-length encoded data. These encoding targets are effective when the number of colors included in an image to be encoded is small, and typically, when a document image including only a character string (including a line draw image) is to be encoded. However, when an original image to be encoded includes both a background with a gradation (gradation image) such as a natural image and characters, an image obtained by decoding is largely different from the original image.

Hence, the fourth embodiment will explain an example that can remove such drawback. In the fourth embodiment to be described below as well, a description will be given under the assumption that image data to be encoded is monochrome multi-value image data, and one pixel block has a size of 16×16 pixels.

Figure 15:
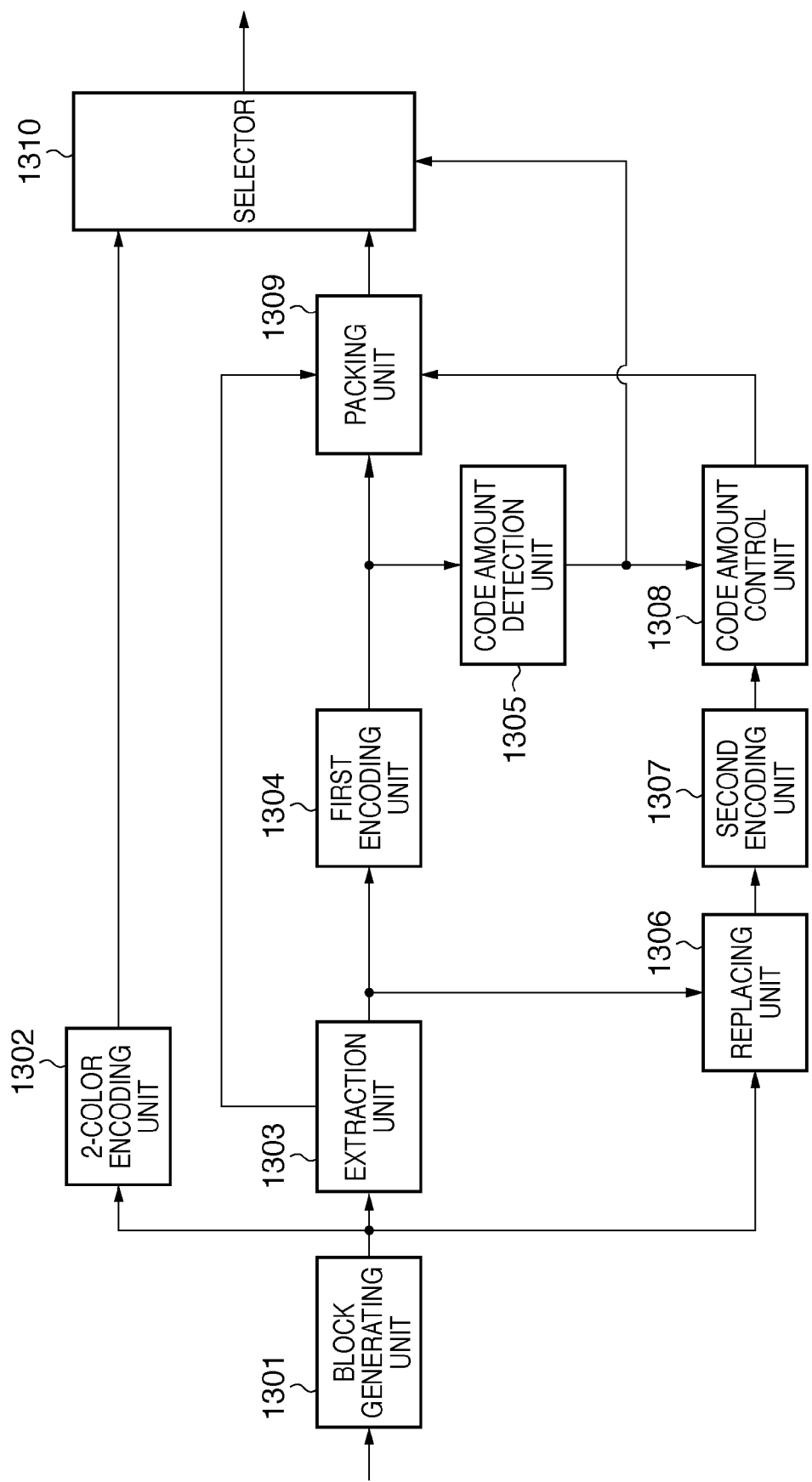
FIG. 15 is a block diagram showing the arrangement of an image encoding apparatus according to the fourth embodiment.

FIG. 15 is a block diagram showing the arrangement of an image encoding apparatus according to the fourth embodiment. This apparatus has a block generating unit 1301, 2-color encoding unit 1302, extraction unit 1303, first encoding unit 1304, code amount detection unit 1305, replacing unit 1306, second encoding unit 1307, code amount control unit 1308, packing unit 1309, and selector 1310. Details of respective processing units will be described below.

The block generating unit 1301 is the same as the block generating unit 101 shown in FIG. 1, and extracts and outputs a pixel block of 16×16 pixels from an input image.

The 2-color encoding unit 1302 corresponds to the encoding apparatus described in the first, second, or third embodiment. However, since the block generating unit 1301 is shown in FIG. 15, the 2-color encoding unit 1302 need not include the block generating unit 101. In the first and second embodiments, encoded data having a fixed length of 256 bits per pixel block is generated. However, assume that the 2-color encoding unit 1302 of this embodiment generates encoded data of 255 bits fewer by 1 bit per pixel block. Needless to describe, the number of deletion target positions in a deletion pattern in the first, second, and third embodiments can be increased by one to generate such encoded data.

The extraction unit 1303 determines if image data of a pixel block input from the block generating unit 1301 includes pixels as high frequency components, and outputs the determination result and a color (extracted color) of the pixels of the high frequency components to the packing unit 1309. The extraction unit 1303 outputs identification data indicating whether or not each pixel of a pixel block of interest is that of a high frequency component, i.e., indicating an extracted color/non-extracted color to the first encoding unit 1304 and replacing unit 1306. In order to distinguish from the identification data in the first, second, and third embodiments described above, identification data generated by the extraction unit 1303 of the fourth embodiment will be referred to as second identification data hereinafter. This second identification data can be 1 bit per pixel since it can identify whether or not each pixel in a pixel block is that of a high frequency component. That is, since one pixel block includes 16×16 pixels, second identification data for one pixel block amount to a total of 256 bits.

An algorithm for determining a pixel of a high frequency component in this extraction unit 1303 may be the same as that of the 2-color extraction unit 102 of the first embodiment. That is, an average value of values of pixels in a pixel block of interest is calculated, and the pixels in the pixel block of interest are classified into two groups, i.e., pixels having values equal to or smaller than the average value (group A), and those having values larger than the average value (group B). Then, the average values of the groups A and B are further calculated, and when a value obtained by subtracting the average value of the group A from that of the group B is larger than a pre-set threshold, it is determined that pixels which belong to the group B are those having high frequency components (or vice versa). The fourth embodiment generates a second identification data element "1" for a pixel of a high frequency component and "0" for that of a non-high frequency component.

Therefore, this extraction unit 1303 serves as a second extraction unit which determines whether or not image data of a pixel block includes pixels of high frequency components, and extracts the color of pixels of the high frequency components as an extracted color, and as a second generating unit which generates second identification data elements each used to identify whether each pixel of the pixel block is that of the extracted color or a non-extracted color.

The first encoding unit 1304 compresses the input 256-bit second identification data and outputs encoded data. The first encoding unit 1304 compresses the second identification data by an algorithm used in compression of binary data such as known runlength encoding.

The code amount detection unit 1305 detects a code amount output from the first encoding unit 1304, and outputs the detection result to the code amount control unit 1308 and selector 1310.

The replacing unit 1306 converts image data of the pixel block of interest with reference to the second identification data, so as to allow the subsequent second encoding unit 1307 to effectively encode data. The conversion processing of this replacing unit 1306 will be described below.

Let P(x, y) (x, y=0, 1, ..., 15) be a pixel value output from the block generating unit 1301, and B(x, y) be a second identification data element output from the extraction unit 1303.

The replacing unit 1306 calculates an average value Pave of pixel values of non-high frequency components.

$$Pave = \Sigma P(x,y) \times (1 - B(x,y))/N$$

where N indicates the number of second identification data elements "0".

The replacing unit 1306 outputs, to the second encoding unit 1307, a pixel value determined as a non-high frequency component intact and a pixel value of a high frequency component by replacing it by the average value Pave. That is, the average value Pave is used as replacing color data. Practical processing of the replacing unit 1306 is as follows.

Output $P(x,y)$ when $B(x,y)=0$

Output Pave as $P(x,y)$ when $B(x,y)=1$

As a result, the image data of the pixel block of interest is converted into a state including no or a small number of pixels of high frequency components.

The second encoding unit 1307 encodes the replaced image data of the pixel block of interest. This encoding uses a known method advantageous for compression of a multi-value image such as JPEG. In this embodiment, since one pixel block includes 16×16 pixels, this pixel block can be encoded as a macroblock in JPEG. That is, since JPEG executes DCT, quantization, and entropy encoding to have 8×8 pixels as a unit, this processing is executed four times. However, assume that this second encoding unit 1307 outputs encoded data in the order of a DC component and AC component. Also, the pixel block to be encoded by the second encoding unit 1307 includes no or a small number of high frequency components, as described above. Therefore, the second encoding unit 1307 can generate encoded data with a sufficiently high compression ratio.

The code amount control unit 1308 serves as a data amount suppression unit that suppresses a data amount of encoded data output from the second encoding unit 1307. A value to be limited is that obtained by subtracting two values, i.e., the extracted color (the value of pixel data determined to have high frequency components) and the code amount of the encoded data output from the first encoding unit 1304 from a target code amount (255 bits in this embodiment).

As a result, some encoded data are likely to be deleted from the second encoding unit 1307. However, encoded data of a DC component is not deleted since it is located at the head of encoded data.

The packing unit 1309 generates encoded data of 255 bits by packing the extracted color, the encoded data of the second identification data, and the encoded data of the multi-value image generated by the second encoding unit 1307 in this order, and outputs the generated encoded data to the selector 1310.

Note that encoded data output from the 2-color encoding unit 1302 will be referred to as first output data, and that output from the packing unit 1309 will be referred to as second output data hereinafter.

The selector 1310 selects and outputs one of the first and second output data based on the encoded data amount of the second identification data from the code amount detection unit 1305. More specifically, when the code amount of the second identification data from the code amount detection unit 1305 is equal to or larger than a pre-set threshold, the selector 1310 selects and outputs the first output data; when the code amount of the second identification data is less than the threshold, it selects and outputs the second output data. At this time, in order to determine whether the 2-color encoding unit 1302 or packing unit 1309 outputs encoded data, the selector 1310 appends 1 discrimination bit to the head of the selected encoded data. As a result, encoded data of 256 bits per pixel block is generated.

As described above, according to the fourth embodiment, although the number of identification data to be deleted based on the deletion pattern is increased by one compared to the first, second, and third embodiments, fixed-length encoded data can be generated while maintaining sufficiently high image quality even for a gradation image such as a natural image.

Note that the above embodiments have exemplified a monochrome image including only one color component as an image to be encoded. However, when an image in which one pixel is expressed by a plurality of color components such as RGB, YMC, or Lab is to be encoded, fixed-length encoded data can be generated for each component.

The embodiments according to the present invention have been described. The processing described in each embodiment may be implemented by a computer program executed by an information processing apparatus such as a personal computer. In this case, parts corresponding to the processing units described in each embodiment may be implemented as subroutines or functions, and the overall apparatus may be implemented as a main routine. Normally, a computer program is stored in a computer-readable storage medium such as a CD-ROM. The storage medium is set in a reader (CD-ROM drive or the like) of the computer, and is copied to or installed in a system, so that the computer program is ready to execute. Therefore, the computer-readable storage medium is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126454, filed on May 13, 2008, No. 2008-298570, filed on Nov. 21, 2008, and No. 2009-012342, filed on Jan. 22, 2009, which are hereby incorporated by reference herein in their entirety.

What is claimed is:

1. An image encoding apparatus for encoding image data in which one pixel is expressed by a plurality of bits to have blocks each including m×n pixels as a unit, and generating encoded data having a fixed length of L bits, which are not more than m×n bits, per block, said apparatus comprising:

an input unit which inputs image data for respective blocks;
an extraction unit which extracts representative colors C0 and C1 from image data of an input block of interest;
a generating unit which generates identification data of m×n bits by assigning 1 bit indicating one of the representative colors C0 and C1 to which each of pixels in the block of interest is approximate, to each pixel;
a memory unit which stores pattern data used to, when the number of bits required to specify the representative colors C0 and C1 is defined by N, delete {N+1} identification data elements from the identification data for one block generated by said generating unit and to specify deletion target pixel positions which are separated from each other by at least a distance of not less than one pixel;
a determination unit which determines, according to the pattern data stored in said memory unit, which of identification data elements approximate to the representative color C0 and identification data elements approximate to the representative color C1 are deleted more, and generates determination data of 1 bit indicating the determination result;
a correcting unit which corrects non-deletion target identification data which are located near deletion positions, according to the determination result of said determination unit;
a deletion unit which deletes the {N+1} identification data elements from m×n identification data elements after correction by said correcting unit, with reference to the pattern data stored in said memory unit; and
an output unit which couples data indicating the representative colors C0 and C1 extracted by said extraction unit, the determination data generated by said determination unit, and remaining identification data after deletion by said deletion unit, and outputs the coupled data as encoded data of the block of interest.

2. The apparatus according to claim 1, wherein the fixed length L is an integer multiple of 32.

3. The apparatus according to claim 1, wherein said extraction unit calculates an average value AVE of pixel values in the block of interest, said extraction unit classifies the pixels in the block of interest into a first group including pixels having pixel values not more than the average value AVE and a second group including pixels having pixel values larger than the average value AVE, and
said extraction unit extracts an average value of the pixel values that belong to the first group and an average value of the pixel values that belong to the second group as the representative colors C0 and C1.

4. The apparatus according to claim 1, wherein letting Ca be a color indicated by the identification data elements, a larger number of which are to be deleted, determined by said determination unit, and Cb be a color indicated by the identification data elements, a smaller number of which are to be deleted, only when an identification data element at a pixel position of interest as a deletion target position indicates the color Cb, said correcting unit replaces one non-deletion target identification data element, which is located near the pixel position of interest, and indicates the color Ca, by the identification data element indicating the color Cb.

5. The apparatus according to claim 4, wherein said correcting unit counts the number of identification data elements indicating the color Cb in regions each of which is defined by combining one pixel of eight pixels that neighbor the deletion position, and two consecutive pixels which contact the one pixel, and replaces an identification data element of the neighboring pixel in a region with the smallest count number by the identification data element indicating the color Cb.

6. The apparatus according to claim 4, wherein said correcting unit includes a replacing pattern memory unit which stores replacing pattern data used to convert an identification data element located near the deletion position to a predetermined identification data element, and said correcting unit applies conversion processing to the identification data element near the deletion position with reference to the stored replacing data pattern.

7. The apparatus according to claim 6, wherein the replacing pattern data is generated by giving priority, as a position of identification data to be replaced of pixels which are located near the deletion position, to:

(1) a position of an identification data element indicating the color Ca;

(2) one of upper, lower, right, and left neighboring positions of the deletion position;

(3) a position that avoids formation of three consecutive identification data elements indicating the color Cb in one of upper, lower, right, and left directions as a result of replacement;

(4) a position where the color Cb exists on an opposite side of the deletion position; and (5) a position that does not disturb formation of three consecutive identification data elements indicating the color Ca as a result of replacement.

8. An image decoding apparatus for decoding encoded data obtained by encoding a block including m×n pixels to have a fixed length of L bits, comprising:

an input unit which inputs the encoded data of the fixed length;

a separation unit which separates, from the input encoded data, N-bit data used to specify representative colors C0 and C1 of a block of interest, 1-bit determination data indicating one of the representative colors C0 and C1 corresponding to the larger number of deleted identification data elements, and (L−N−1)-bit identification data;

a memory unit which stores pattern data used to specify pixel positions of {N+1} deletion target identification data elements, which are separated from each other by at least a distance of not less than one pixel;

an interpolation unit which generates identification data of m×n bits by interpolating identification data elements indicated by the determination data to deletion positions in the identification data separated by said separation unit in accordance with the pattern data stored in said memory unit; and a decoding unit which selects and outputs one of the representative colors C0 and C1 obtained by said separation unit as decoded pixel data based on each of the identification data elements interpolated by said interpolation unit.

9. An image encoding apparatus for encoding image data in which one pixel is expressed by a plurality of bits to have blocks each including m×n pixels as a unit, and generating encoded data having a fixed length of L bits, which are not more than m×n bits, per block, said apparatus comprising:

an input unit which inputs image data for respective blocks;

an extraction unit which extracts representative colors C0 and C1 from image data of an input block of interest;

a generating unit which generates identification data of m×n bits by assigning 1 bit indicating one of the representative colors C0 and C1 to which each of pixels in the block of interest is approximate, to each pixel;

a memory unit which stores pattern data used to, when the number of bits required to specify the representative colors C0 and C1 is defined by N, delete N identification data elements from the identification data for one block generated by said generating unit and to specify deletion target pixel positions which are separated from each other by at least a distance of not less than one pixel;

a correcting unit which corrects, when identification data at a pixel position of interest as a deletion target assumes a predetermined value, non-deletion target identification data elements which are located near deletion positions;

a deletion unit which deletes the N identification data from m×n identification data after correction by said correcting unit, with reference to the pattern data stored in said memory unit; and an output unit which couples data indicating the representative colors C0 and C1 extracted by said extraction unit and remaining identification data after deletion by said deletion unit, and outputs the coupled data as encoded data of the block of interest.

10. The apparatus according to claim 9, wherein the fixed length L is an integer multiple of 32.

11. The apparatus according to claim 9, wherein said extraction unit calculates an average value AVE of pixel values in the block of interest, said extraction unit classifies the pixels in the block of interest into a first group including pixels having pixel values not more than the average value AVE and a second group including pixels having pixel values larger than the average value AVE, and said extraction unit extracts an average value of the pixel values that belong to the first group and an average value of the pixel values that belong to the second group as the representative colors C0 and C1.

12. An image decoding apparatus for decoding encoded data obtained by encoding a block including m×n pixels to have a fixed length of L bits, comprising:

an input unit which inputs the encoded data of the fixed length;

a separation unit which separates, from the input encoded data, N-bit data used to specify representative colors C0 and C1 of a block of interest, and (L−N)-bit identification data;

a memory unit which stores pattern data used to specify pixel positions of N deletion target identification data elements, which are separated from each other by at least a distance of not less than one pixel;

an interpolation unit which generates identification data of m×n bits by interpolating identification data elements having a pre-set value to deletion positions in the identification data separated by said separation unit in accordance with the pattern data stored in said memory unit; and a decoding unit which selects and outputs one of the representative colors C0 and C1 obtained by said separation unit as decoded pixel data based on each of the identification data elements interpolated by said interpolation unit.

13. The apparatus according to claim 12, wherein said interpolation unit includes a replacing pattern memory unit which stores replacing pattern data used to convert an identification data element located near the deletion position to a predetermined identification data element, and said interpolation unit applies interpolation processing to the identification data elements at and near the deletion position with reference to the stored replacing data pattern.

14. The apparatus according to claim 13, wherein when said interpolation unit selects one identification data element located near the deletion position according to the replacing data pattern, and when the pixel position of interest satisfies all conditions (1) to (4):

(1) the pixel position of interest is one of upper, lower, right, and left neighboring positions of a deletion target position;

(2) identification data of three pixels which include the pixel position of interest and line up in one of upper, lower, right, and left directions do not assume the same value;

(3) assuming that a deletion position is interpolated by identification data having a polarity opposite to a polarity indicated by determination data, identification data of three pixels in one of upper, lower, right, left, and oblique directions, which include the identification data at the deletion position after interpolation, assume the same value; and (4) only one position that satisfies the conditions (1) to (3) is included in eight pixels which neighbor the deletion position, said interpolation unit replaces the identification data element at the pixel position of interest by the identification data element interpolated to the deletion position.

15. The apparatus according to claim 1, further comprising:

a second extraction unit which determines whether or not image data of a block input by said input unit includes pixels of high frequency components, and extracts a color of the pixels of the high frequency components as an extracted color;

a second generating unit which generates second identification data used to identify whether each of the pixels of the block is a pixel of the extracted color or a pixel of a non-extracted color;

a first encoding unit which encodes the second identification data generated by said second generating unit;

a calculation unit which calculates replacing color data used to replace pixel data having the extracted color, based on pixel data of the non-extracted color in the block;

a replacing unit which replaces data having the extracted color by the replacing color data calculated by said calculation unit;

a second encoding unit which encodes image data of the block replaced by said replacing unit;

a detection unit which detects a data amount of encoded data generated by said first encoding unit;

a data amount suppression unit which suppresses a data amount of encoded data generated by said second encoding unit, based on the data amount detected by said detection unit;

a second output unit which couples information of the extracted color, the encoded data generated by said first encoding unit, and encoded data obtained by said data amount suppression unit, and outputs encoded data of L bits; and a selection unit which selects the encoded data from one of said output unit and said second output unit based on a detection result of said detection unit, and outputs the selected encoded data as encoded data of (L+1) bits by appending 1 discrimination bit indicating an output source of the selected encoded data to a head of the selected encoded data.

16. The apparatus according to claim 15, wherein the (L+1) bits are an integer multiple of 32.

17. A method of controlling an image encoding apparatus, which includes a memory unit that stores pattern data used to specify (N+1) positions which are included in a block having an m×n size and are separated from each other by a distance of not less than one pixel, and which encodes image data in which one pixel is expressed by a plurality of bits to have blocks each having the m×n size as a unit, and generates encoded data having a fixed length of L bits, which are not more than m×n bits, per block, said method comprising:

an input step of inputting image data for respective blocks;

an extraction step of extracting representative colors C0 and C1 from image data of an input block of interest;

a generating step of generating identification data of m×n bits by assigning 1 bit indicating one of the representative colors C0 and C1 to which each of pixels in the block of interest is approximate, to each pixel;

a determination step of determining, according to the pattern data stored in the memory unit, which of identification data elements approximate to the representative color C0 and identification data elements approximate to the representative color C1 are deleted more, and generating determination data of 1 bit indicating the determination result;

a correcting step of correcting non-deletion target identification data which are located near deletion positions, according to the determination result in the determination step;

a deletion step of deleting the {N+1} identification data elements from m×n identification data elements after correction in the correcting step, with reference to the pattern data stored in the memory unit; and an output step of coupling data indicating the representative colors C0 and C1 extracted in the extraction step, the determination data generated in the determination step, and remaining identification data after deletion in the deletion step, and outputting the coupled data as encoded data of the block of interest.

18. The method according to claim 17, wherein the image encoding apparatus further includes a replacing pattern memory unit that stores replacing pattern data used to convert an identification data element located near the deletion position to a predetermined identification data element, and in the correcting step, conversion processing is applied to the identification data element near the deletion position with reference to the stored replacing data pattern.

19. A method of controlling an image decoding apparatus, which includes a memory unit that stores pattern data used to specify (N+1) positions which are included in a block having an m×n size and are separated from each other by a distance of not less than one pixel, and which decodes encoded data obtained by encoding the block including m×n pixels to have a fixed length of L bits, said method comprising:

an input step of inputting the encoded data of the fixed length;

a separation step of separating, from the input encoded data, N-bit data used to specify representative colors C0 and C1 of a block of interest, 1-bit determination data indicating one of the representative colors C0 and C1 corresponding to the larger number of deleted identification data elements, and (L−N−1)-bit identification data;

an interpolation step of generating identification data of m×n bits by interpolating identification data elements indicated by the determination data to deletion positions in the identification data separated in the separation step in accordance with the pattern data stored in the memory unit; and a decoding step of selecting and outputting one of the representative colors C0 and C1 obtained in the separation step as decoded pixel data based on each of the identification data elements interpolated in the interpolation step.

20. The method according to claim 19, wherein the image decoding apparatus further includes a replacing pattern memory unit that stores replacing pattern data used to convert an identification data element located near a deletion position to a predetermined identification data element, and in the interpolation step, interpolation processing is applied to deletion positions and identification data elements near the deletion positions are converted with reference to the stored replacing pattern data.

21. A method of controlling an image encoding apparatus, which includes a memory unit that stores pattern data used to specify N positions which are included in a block having an m×n size and are separated from each other by a distance of not less than one pixel, and which encodes image data in which one pixel is expressed by a plurality of bits to have blocks each having the m×n size as a unit, and generates encoded data having a fixed length of L bits, which are not more than m×n bits, per block, said method comprising:

an input step of inputting image data for respective blocks;

an extraction step of extracting representative colors C0 and C1 from image data of an input block of interest;

a generating step of generating identification data of m×n bits by assigning 1 bit indicating one of the representative colors C0 and C1 to which each of pixels in the block of interest is approximate, to each pixel;

a correcting step of correcting, when identification data element at a pixel position of interest as a deletion target assumes a predetermined value, non-deletion target identification data elements which are located near deletion positions;

a deletion step of deleting the N identification data elements from m×n identification data elements after correction in the correcting step, with reference to the pattern data stored in the memory unit; and an output step of coupling data indicating the representative colors C0 and C1 extracted in the extraction step and remaining identification data after deletion in the deletion step, and outputting the coupled data as encoded data of the block of interest.

22. A method of controlling an image decoding apparatus, which includes a memory unit that stores pattern data used to specify N positions which are included in a block having an m×n size and are separated from each other by a distance of not less than one pixel, and which decodes encoded data obtained by encoding the block including m×n pixels to have a fixed length of L bits, said method comprising:

an input step of inputting the encoded data of the fixed length;

a separation step of separating, from the input encoded data, N-bit data used to specify representative colors C0 and C1 of a block of interest, 1-bit determination data indicating one of the representative colors C0 and C1 corresponding to the larger number of deleted identification data elements, and (L−N−1)-bit identification data;

an interpolation step of generating identification data of m×n bits by interpolating 1-bit preset predetermined data to deletion positions in the identification data separated in the separation step in accordance with the pattern data stored in the memory unit; and a decoding step of selecting and outputting one of the representative colors C0 and C1 obtained in the separation step as decoded pixel data based on each of the identification data elements interpolated in the interpolation step.

23. The method according to claim 17, further comprising:

a second extraction step of determining whether or not image data of a block input in the input step includes pixels of high frequency components, and extracting a color of the pixels of the high frequency components as an extracted color;

a second generating step of generating second identification data used to identify whether each of the pixels of the block is a pixel of the extracted color or a pixel of a non-extracted color;

a first encoding step of encoding the second identification data generated in the second generating step;

a calculation step of calculating replacing color data used to replace pixel data having the extracted color based on pixel data of the non-extracted color in the block;

a replacing step of replacing data having the extracted color by the replacing color data calculated in the calculation step;

a second encoding step of encoding image data of the block replaced in the replacing step;

a detection step of detecting a data amount of encoded data generated in the first encoding step;

a data amount suppression step of suppressing a data amount of encoded data generated in the second encoding step based on the data amount detected in the detection step;

a second output step of coupling information of the extracted color, the encoded data generated in the first encoding step, and encoded data obtained in the data amount suppression step, and outputting encoded data of L bits; and a selection step of selecting the encoded data from one of the output step and the second output step based on a detection result in the detection step, and outputting the selected encoded data as encoded data of (L+1) bits by appending 1 discrimination bit indicating an output source of the selected encoded data to a head of the selected encoded data.

24. A computer-readable memory medium storing a computer program to make a computer function as an image encoding apparatus according to claim 1 when the computer loads and executes the computer program.

25. A computer-readable memory medium storing a computer program to make a computer function as an image decoding apparatus according to claim 8 when the computer loads and executes the computer program.

* * * * *